United States Patent
Williams

(10) Patent No.: US 9,442,344 B2
(45) Date of Patent: Sep. 13, 2016

(54) NANOCOMPOSITE HIGH ORDER NONLINEAR OPTICAL-ELEMENT

(71) Applicant: Vadient Optics, LLC., Beaverton, OR (US)

(72) Inventor: George Williams, Portland, OR (US)

(73) Assignee: Vadient Optics, LLC, Beaverton, OR (US)

( * ) Notice: Subject to any disclaimer, the term of this patent is extended or adjusted under 35 U.S.C. 154(b) by 6 days.

(21) Appl. No.: 14/293,574

(22) Filed: Jun. 2, 2014

(65) Prior Publication Data

US 2015/0346580 A1    Dec. 3, 2015

(51) Int. Cl.

| | |
|---|---|
| *G02F 1/35* | (2006.01) |
| *G02F 1/361* | (2006.01) |
| *G02B 3/00* | (2006.01) |
| *G02B 27/00* | (2006.01) |
| *G02F 1/365* | (2006.01) |
| *G02B 5/00* | (2006.01) |
| *B82Y 20/00* | (2011.01) |

(52) U.S. Cl.
CPC ........... *G02F 1/3526* (2013.01); *G02B 3/0037* (2013.01); *G02B 5/008* (2013.01); *G02B 27/0025* (2013.01); *G02F 1/3511* (2013.01); *G02F 1/361* (2013.01); *G02F 1/365* (2013.01); *B82Y 20/00* (2013.01); *G02F 2001/3505* (2013.01); *Y10S 977/783* (2013.01); *Y10S 977/834* (2013.01)

(58) Field of Classification Search
None
See application file for complete search history.

(56) References Cited

U.S. PATENT DOCUMENTS

| | | |
|---|---|---|
| 5,498,444 A | 3/1996 | Hayes |
| 5,707,684 A | 1/1998 | Hayes et al. |
| 5,800,000 A | 9/1998 | Shockley |
| 5,807,906 A | 9/1998 | Bonvallot et al. |
| 6,593,415 B2 | 7/2003 | Koike et al. |
| 6,656,990 B2 | 12/2003 | Shustack et al. |
| 6,805,902 B1 | 10/2004 | Hayes |
| 6,836,371 B2 | 12/2004 | Lai et al. |

(Continued)

FOREIGN PATENT DOCUMENTS

| | | |
|---|---|---|
| EP | 2412767 A1 | 2/2012 |
| EP | 2474404 A1 | 6/2012 |

(Continued)

OTHER PUBLICATIONS

Richard Chartoff, et al., Functionally Graded Polymer Matrix Nano-Composites by Solid Freeform Fabrciation: A Preliminary Report, Solid Freeform (SFF) symposium, [online], 2003, pp. 385-391, [retrieved on Apr. 23, 2015]. from the Internet: <http://sffsymposium.engr.utexas.edu/Manuscripts/2003/2003-36-Chartoff.pdf>.

(Continued)

*Primary Examiner* — Daniel Petkovsek

(57) ABSTRACT

A nonlinear nanocomposite optical-element comprising a first nanocomposite. The first nanocomposite comprising one or more optically nonlinear (NLO) nanofillers. The NLO nanofillers exhibiting dispersed in a cured organic matrix, the NLO nanofillers exhibiting a high level of one or more high order nonlinear susceptibilities. A second nanocomposite, the second nanocomposite different with respect to the nanofiller type, nanofiller concentration, organic-host, or combinations thereof. Wherein the distribution of the first nanocomposite-ink and second nanocomposite-ink result in a nanofiller gradient within the optical-element.

55 Claims, 15 Drawing Sheets

(56) References Cited

U.S. PATENT DOCUMENTS

| | | | |
|---|---|---|---|
| 6,934,088 B2 | 8/2005 | Lai et al. | |
| 6,976,641 B2 | 12/2005 | Lai et al. | |
| 7,046,439 B2 | 5/2006 | Kaminsky et al. | |
| 7,420,743 B2 | 9/2008 | Lai et al. | |
| 7,473,721 B2 | 1/2009 | Harada et al. | |
| 8,067,402 B2* | 11/2011 | Whiteford | A01N 43/90 514/183 |
| 2010/0173167 A1* | 7/2010 | Vissing | B05D 3/06 428/447 |
| 2014/0303287 A1* | 10/2014 | Li | C08L 75/04 524/4 |
| 2015/0021528 A1 | 1/2015 | Chartoff et al. | |
| 2015/0023643 A1 | 1/2015 | Chartoff et al. | |

FOREIGN PATENT DOCUMENTS

| | | |
|---|---|---|
| EP | 2469309 B1 | 8/2013 |
| EP | 2392473 B1 | 9/2013 |

OTHER PUBLICATIONS

Richard Chartoff, et al., Polymer Matrix Nanocomposites by Inkjet Printing, Solid Freeform (SFF) symposium, [online], 2005, pp. 174-183, [retrieved on Apr. 23, 2015]. from the Internet: <http://sffsymposium.engr.utexas.edu/Manuscripts/2005/2005-16-Chartoff.pdf>.

Gema De La Torre, et al., Role of Structural Factors in the Nonlinear Optical Properties of Phthalocyanines and Related Compounds, Chem. Rev. 2004, vol. 104, pp. 3723-3750, Published by American Chemical Society on the web Aug. 11, 2004, from the internet: <http://pubs.acs.org/doi/abs/10.1021/cr030206t?journalCode=chreay>.

Raul Del Coso, et al., Relation between nonlinear refractive index and third-order susceptibility in absorbing media, J. Opt. Soc. Am. B/vol. 21, No. 3, Mar. 2004 [retrieved on Apr. 24, 2015]. from the Internet: <http://digital.csic.es/bitstream/10261/62047/1/Coso.pdf>.

* cited by examiner

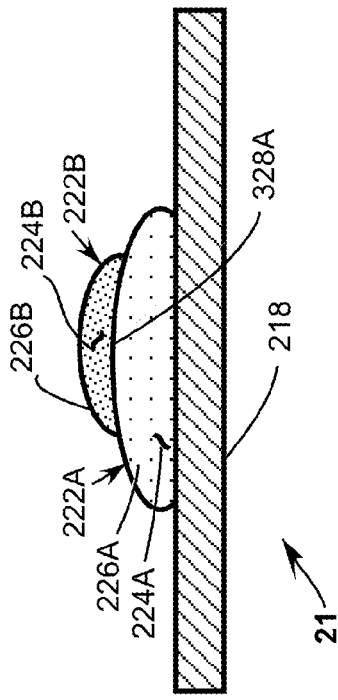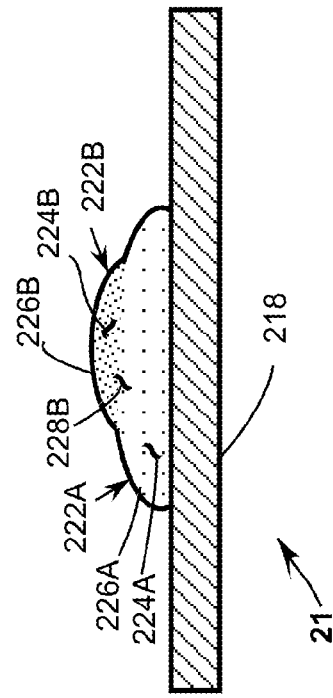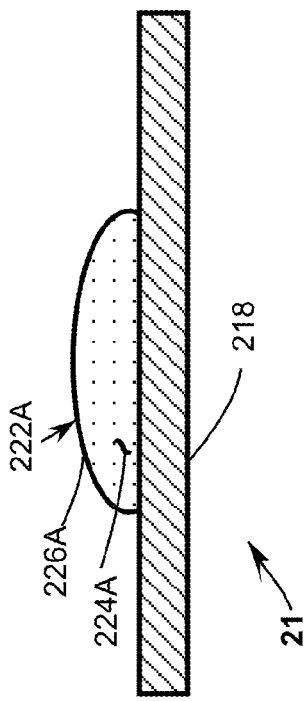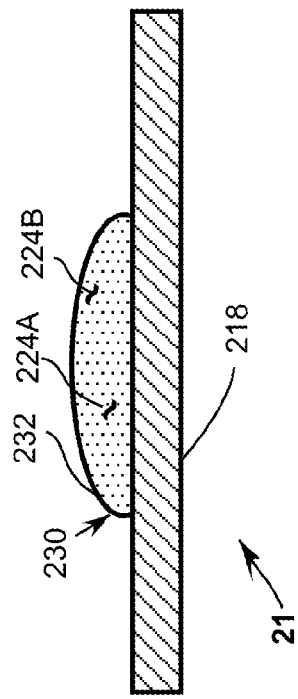

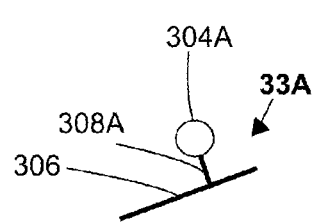
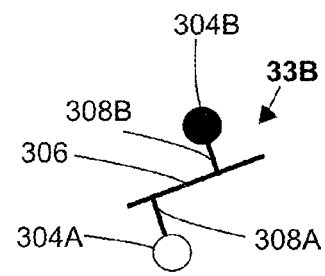
FIG. 3H
FIG. 3I
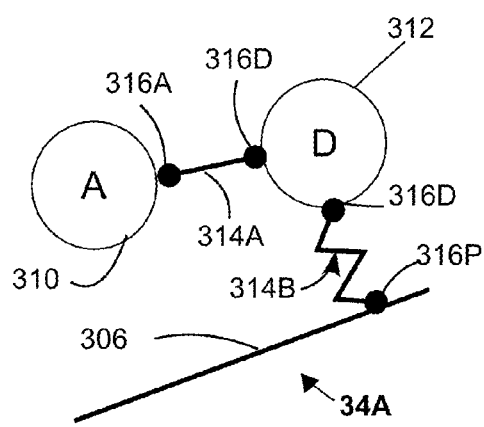
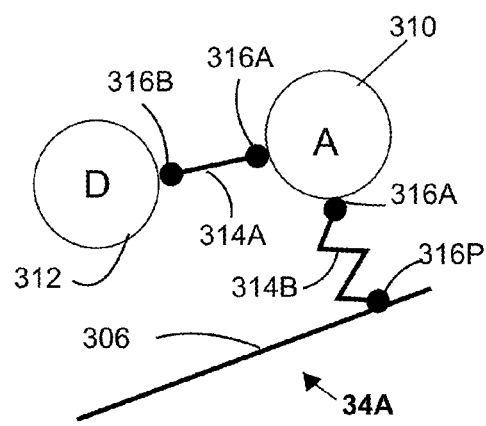
FIG. 3J
FIG. 3K
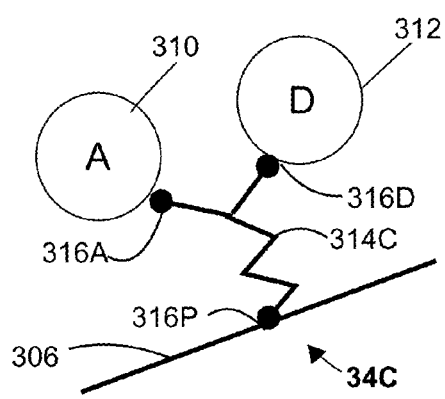
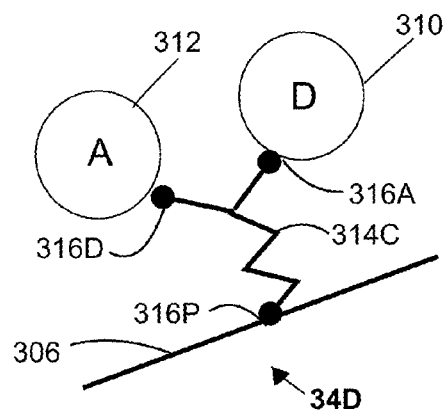
FIG. 3L
FIG. 3M

NANOCOMPOSITE HIGH ORDER NONLINEAR OPTICAL-ELEMENT

TECHNICAL FIELD OF THE DISCLOSURE

The present disclosure relates in general to high-order nonlinear optics. The disclosure relates in particular to high order optical-elements made with ink jet printable nanocomposite materials.

DISCUSSION OF BACKGROUND ART

Nonlinear optics utilize high order nonlinear effect. Materials that exhibit high order nonlinear susceptibility, including odd orders, exhibit nonlinear effects when light, with sufficient intensity, passes through the material. Classic applications implement bulk materials. This application relates to another approach.

SUMMARY OF THE DISCLOSURE

The present disclosure is directed to optically nonlinear (NLO) nanocomposite optical-elements. In one aspect, an optical-element in accordance with the present disclosure comprises of a first nanocomposite. The first nanocomposite comprising NLO nanofillers dispersed in a cured organic-matrix. The NLO nanofillers exhibiting a high level of one or more high order nonlinear susceptibilities. A second nanocomposite. The second nanocomposite different with respect to the nanofiller type, nanofiller concentration, organic-host, or combinations thereof. Wherein the distribution of the first nanocomposite-ink and second nanocomposite-ink result in a nanofiller gradient within the optical-element.

BRIEF DESCRIPTION OF THE DRAWINGS

The accompanying drawings, which are incorporated in and constitute a part of the specification, schematically illustrate preferred embodiments of the present disclosure, and together with the general description given above and the detailed description, of preferred methods and embodiment, given below, serve to explain principles of the present disclosure.

FIG. 2C is a cross-section view, schematically illustrating nanocomposite-ink deposited on a substrate.

FIG. 2D is a cross-section view, schematically illustrating an additional deposit of nanocomposite-ink.

FIG. 2E is a cross-section view, schematically illustrating the resultant nanocomposite from the diffusion or convective mixing of nanofillers from the first and the second nanocomposite-ink as shown in FIG. 2D.

FIG. 2F is a cross-section view, schematically illustrating a resultant refractive-gradient between the first nanocomposite-ink and second nanocomposite-ink from diffusion of nanofillers of the first and second nanocomposite-inks, where the first nanocomposite was partially cured before deposition of the second nanocomposite-ink.

FIG. 3H is a schematic illustrating the bond of one of the linear nanofillers to the organic-host polymer.

FIG. 3I is a schematic illustrating that shown in FIG. 3H further comprising a one of the NLO nanofillers bonded to the organic-host polymer.

FIG. 3J-3K is a schematic illustrating an acceptor-donor NLO structure.

FIG. 3L-M is a schematic illustrating another acceptor-donor NLO structure.

DETAILED DESCRIPTION OF EMBODIMENTS

Figure 1A:
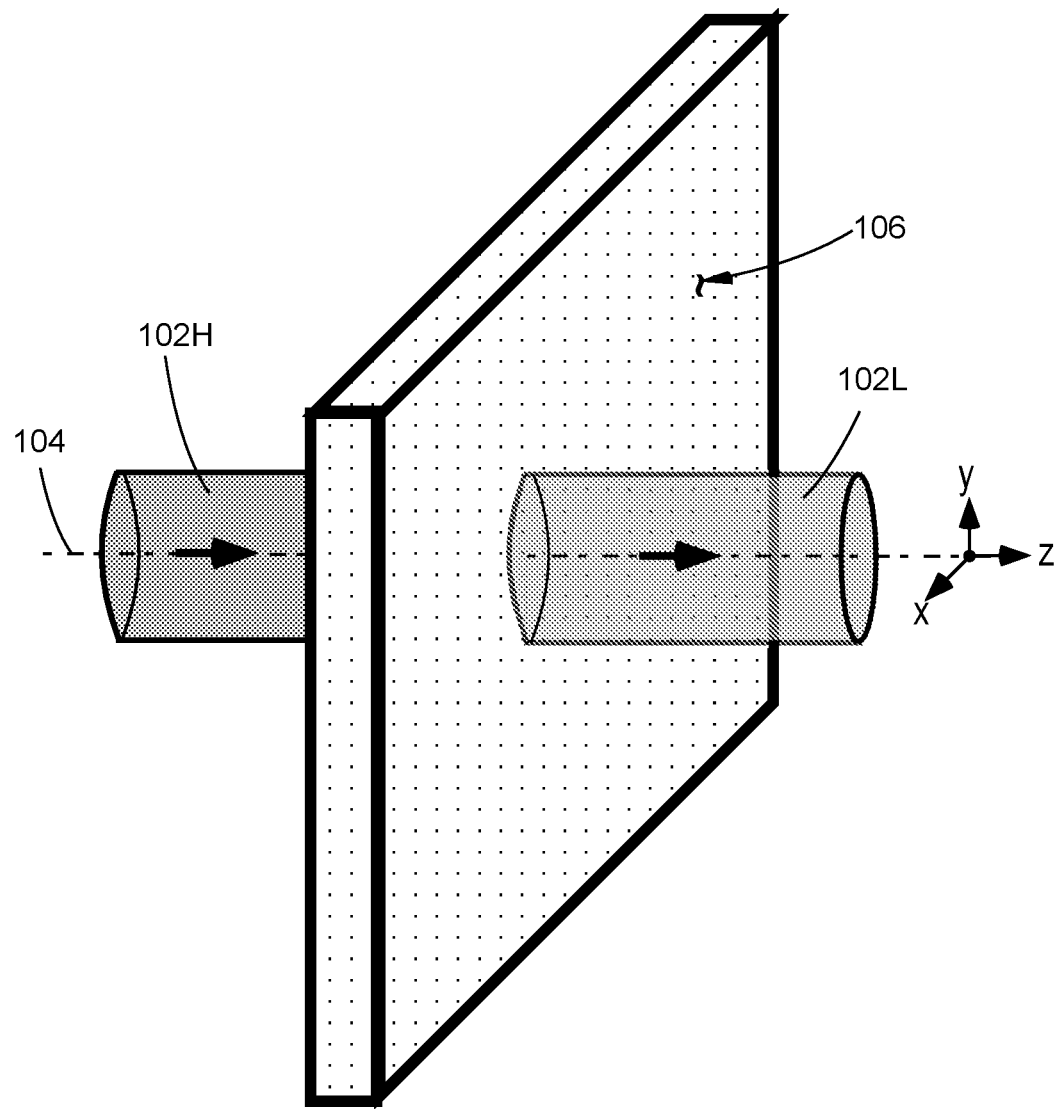
FIG. 1A is a perspective view, schematically illustrating an optical-element in accordance with the present disclosure, comprising of a first nanocomposite. The first nanocomposite comprising optically nonlinear (NLO) nanofillers dispersed in a cured organic-matrix. The NLO nanofillers exhibiting a high level of one or more high order nonlinear susceptibilities. A second nanocomposite. The second nanocomposite different with respect to the nanofiller type, nanofiller concentration, organic-host, or combinations thereof. Wherein the distribution of the first nanocomposite-ink and second nanocomposite-ink result in a nanofiller gradient within the optical-element.

Referring now to the drawings, wherein like components are designated by like reference numerals. Drawings are characterized by Cartesian (mutually perpendicular) axes x, y, and z. Although anyone skilled in the art can transform the axis to other coordinates or topologies. When referring to an optical-element, the z-axis refers generally to the direction of light propagation, and x and y being transverse axes. Methods of manufacture and preferred embodiments of the present disclosure are described further herein below.

FIG. 1A is a perspective view, illustrating a optical-element 10 in accordance with the present disclosure. Optical-element 10 comprises of a first nanocomposite-ink and a second nanocomposite-ink, both intermixed in an area 106. The first nanocomposite-ink comprises of optically nonlinear (NLO) nanofillers dispersed in a first cured organic-matrix, the NLO nanofillers exhibiting high order nonlinear susceptibility. The second nanocomposite-ink comprises of nanofillers dispersed in a second cured organic-matrix, the second nanocomposite-ink different from the first nanocomposite-ink with respect to nanofiller type, nanofiller concentration, organic-matrix, or combinations thereof. Both of the nanocomposite-inks being ink-jet printable. Wherein the distribution of the first nanocomposite-ink and second nanocomposite-ink result in a gradient refractive index (refractive-gradient), gradient of nonlinear NLO nanofillers (NLO-gradient), or combinations thereof, within optical-element 10. The organic-matrix, or matrix, describes the host material for the nanofillers. The matrix can refer to the organic-host, where the organic-host is loaded with nanofillers or without nanofillers. When the matrix is without nanofillers, it is generally referred to as organic-host. FIG. 1A is drawn simply for conceptual purposes, not showing detail of the refractive-gradient, nor the NLO-gradient.

Figure 1B:
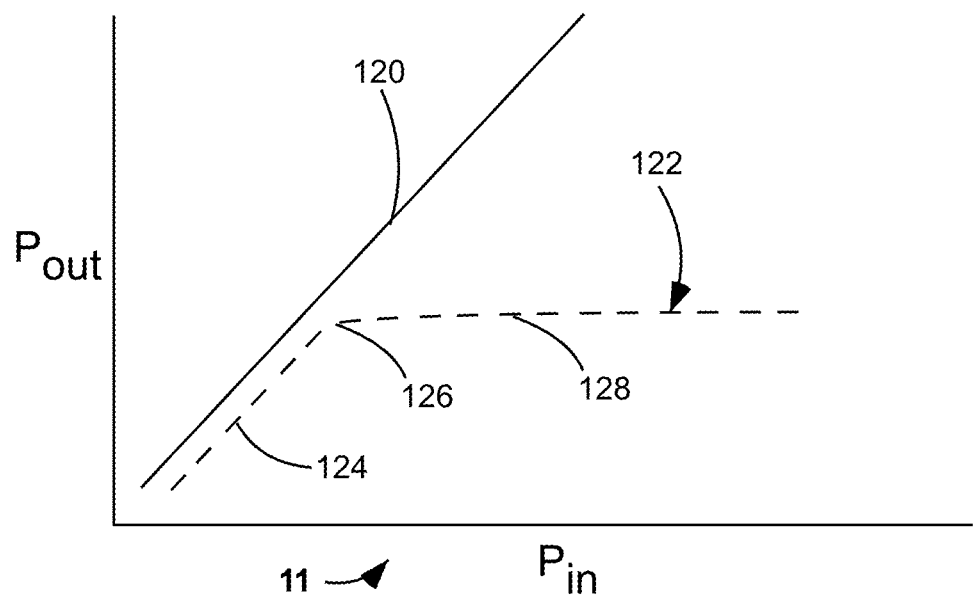
FIG. 1B is a graph representing the ideal optical limiter power input and power output.

Optical-element 10 is exemplary of a nonlinear optical limiter, embodiments, wherein a high intensity light-beam 102H, propagating along an optical-axis 104 in the z-direction, attenuates passing through optical-element 10, resulting in intensity an attenuated light-beam 102L. The attenuation is caused by the NLO nanofillers. When the NLO nanofillers are subjected to an intense light field, such as from a laser, the NLO nanofillers exhibit nonlinear effects. Nonlinear effects that can contribute to optical limiting include absorption, refraction, reflection, and scattering. More complex optical limiting embodiments and other high-order nonlinear applications and embodiments are described further below FIG. 1B is a graph 11 describing optical limiting. For material that is not optically limiting 120, a light output power Pout is linearly proportional to a light input Power $P_{in}$. An ideal optical limiter 122 has a linear proportional region 124, a power threshold 126 at which output power is static at a flat region 122 regardless of the input power.

Figure 1C:
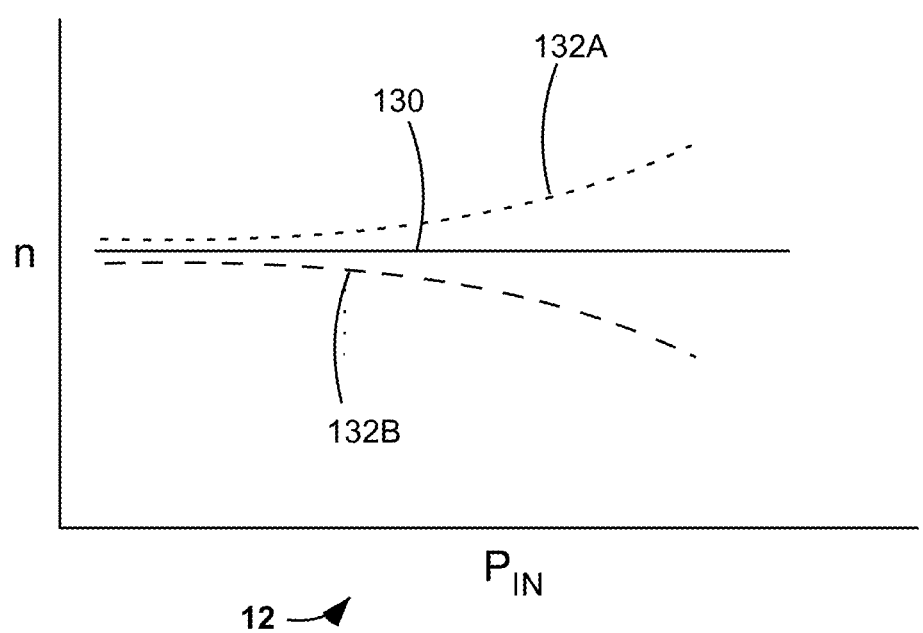
FIG. 1C is a graph representing nonlinear change in refractive index verse input power for optically nonlinear material.

FIG. 1C is a graph demonstrating the difference in a complex refractive-index n with a light intensity $I_L$. A linear material response 120 has linear susceptibly such that the linear material's refractive-index does not significantly change with increased light intensity $I_L$. The linear material for purposes of the embodiments described below, can be made with linear nanoparticles dispersed in the organic matrix. A NLO nanocomposite response 132A has high order nonlinear susceptibility from the NLO nanofillers, such that the refractive-index increases with increased light intensity $I_L$. Alternatively a NLO nanocomposite response 132B can be negative. The linear nanocomposite is classified as linear, with respect to the NLO nanocomposite, if the higher order susceptibility of the linear nanofillers is negligible compared to that of the NLO nanocomposite. Further, for nonlinear effects, described in detail further hereinbelow, the linear nanocomposite is classified as linear if nonlinear effects are negligible.

The nanofillers that contribute to nonlinear effects in NLO nanocomposite include both organic and inorganic chromophores (and nanoparticles) that exhibit high-order nonlinear susceptibility. Likewise, the linear nanofillers that exhibit linear susceptibility are organic and inorganic chromophores (or nanoparticles) that exhibit linear susceptibility. The nanofillers can be added to the organic-host, bond to the organic-host polymer, or unbound. Addition of functional groups (or moieties) on the surface of the nanofillers by chemical synthesis methods allows attachment to virtually any organic-host.

The real and imaginary parts of $\chi^{(3)}$ are the physical parameters that contain the information relative to the microscopic origin of the nonlinearity since they are related to the hyperpolarizabilities of the system.

The nonlinear effects on material due to light waves is usually described by induced electrical polarization. At low irradiation, or low intensity, the electrical polarization is a linear function of the wave field. When material is subjected to intense light field, such as laser light, then the electrical polarization is no longer a linear function of the applied field. This expression is described by:

$$P = \chi^{(1)} \cdot E + \chi^{(2)} \cdot EE + \chi^{(3)} \cdot EEE + \ldots,$$

where P is the induced electrical polarization, E is the wave field from the light, $\chi^{(1)}$ is the first susceptibility (linear), $\chi^{(2)}$ is second susceptibilities (quadratic), $\chi^{(3)}$ is the third susceptibility (quadratic) and so on. At the molecular level, the light-induced molecular dipole moment is described by a similar equation:

$$P = \alpha \cdot E + \beta \cdot EE + \gamma \cdot EEE + \ldots,$$

where P is the induced molecular dipole moment, E is the wave field from the light, $\alpha$ is the linear hyperpolarizability (linear), $\beta$ is the second hyperpolarizability (quadratic), and $\gamma$ is the third hyperpolarizability and so on. For purposes of this disclosure high-order nonlinearity refers to nonlinear effects from odd order susceptibilities and hyperpolarizabilities or combinations of odd and even order susceptibilities and hyperpolarizabilities. High-order nonlinear applications include the multiphoton absorption, optical Kerr effect, cross-phase modulation, four-wave mixing, optical phase conjugation, frequency conversion and others.

Nonlinear absorption can occur from two-photon absorption (TPA), and more generally multiphoton absorption (MPA) which can cause saturable absorption (SA) or reverse saturable absorption (RSA). TPA is a nonlinear effect in which two photons of identical or different energies are absorbed exciting a molecule to a higher electron energy state. In SA, absorption increases with light intensity up to a certain point such that, regardless of entering light intensity, exiting light intensity approaches a constant value. Multiphoton absorption includes TPA, but more generally refers to absorption processes including more complex three-photon, four-photon, other absorption processes and effects. SA is a nonlinear effect, resulting from MPA, in which photons excite atoms from their ground state into an upper energy state at a rate in which there is insufficient time for them to decay back to the ground state, depleting the ground state, thereby saturating the absorption of the material. RSA is the opposite of SA. RSA occurs when the excited absorption state is larger than the ground state. RSA results in higher absorption at high incident laser energies and lower absorption at low energy levels. Reverse saturable absorber nanofillers suitable for nanocomposite-ink include indanthrone dye, stilbene derivatives, calix[n]arene, tetraphenyldiamines, thienyleneethinylene, porphyrins, pthalocyanines, metal clusters, fullerens and carbon nanotubes. For a detailed description of high-order nonlinear properties and some of the materials aforementioned, see Gema de la Torre, et al., *Role of Structural Factors in the Nonlinear Optical Properties of Phtahlocyanines and Related Compounds*, Chem. Rev. 104, 3723 (2004) hereby incorporated by reference in its entirety for the purpose of explaining further detail of high-order nonlinearity and nonlinear molecules.

The optical Kerr effect is a third order nonlinear optical phenomenon. The Kerr effect a change in the refractive index of the material due to the energy of the light irradiating the material. The refractive index change is governed by the nonlinear susceptibility primarily of the $\chi(3)$ term (to a lesser extent the $\chi(5)$ term).

The expressions relating the refractive index and the absorption coefficient with the intensity I of the electromagnetic wave are:

$$n = n_0 + n_2 I,$$

and $$\alpha = \alpha_0 + \beta I,$$

which can also be expressed in terms of the imaginary part of the refractive index $$k = \lambda \alpha / 4\pi \text{ as}$$

$$k = k_0 + \Delta k = k_0 + k_2 I \text{ and } k_2 = \beta \alpha / 4\pi$$

where $k_2$, is the nonlinear absorption, included in order to have symmetrical expressions for the nonlinear refractive and absorptive indexes, $n_0$ and $a_0$ are the linear refractive index and linear absorption coefficient, respectively, n is the refractive index, $n_0$ is the linear refractive index, and I is the intensity of the light field where, $I = 2\epsilon_0 n_0 c|E|^2$. In a system showing a negligible absorption (i.e. $a_0 \approx 0$), the nonlinear refractive index $n_2$ and the nonlinear absorption coefficient $\beta$ are proportional to the real and imaginary parts of $\chi^3$ through the following expressions in the international system (SI) of units:

$$\chi_R^3 = 4/3 n_0^2 \epsilon_0 c n_2, \text{ and}$$

$$\chi_I^3 = n_0^2 \epsilon_0 c \lambda / 3\pi \beta = (4 n_0 \epsilon_0 c/3)(n_0 k_2 + k_0 n_2)$$

where $n_0$, $e_0$, and $\lambda$ denote, respectively, the linear refractive index of the material, the electric permittivity of free space ($8.85 \times 10^{-12}$ F/m), and the wavelength.

Under the restriction of negligible linear absorption, a purely real third-order susceptibility will manifest as purely refractive nonlinear effects, whereas a purely imaginary susceptibility will lead only to nonlinear absorption effects. In absorbing systems, the nonlinear absorption and refraction are thus the consequence of the interplay between the real and imaginary parts of the first- and third-order susceptibilities, and $n_2$ and $\beta$ are no longer proportional to the real and imaginary parts of $\chi^3$ The complete expressions of the nonlinear refractive index and absorption as a function of the third order susceptibility are $$n_2' = \frac{3}{4\epsilon_0 c(n_2'^2 + n_0''^2)}\left(\chi_R^3 + \frac{n_0''}{n_2'}\chi_I^3\right),$$

$$n_2'' = \frac{3}{4\epsilon_0 c(n_2'^2 + n_0''^2)}\left(\chi_I^3 + \frac{n_0''}{n_2'}\chi_R^3\right), \text{ and}$$

$$\beta = \frac{3\pi}{\lambda \epsilon_0 c(n_2'^2 + n_0''^2)}\left(\chi_I^3 + \frac{n_0''}{n_2'}\chi_R^3\right),$$

where $\epsilon_0$, $\lambda$, and c denote, respectively, the electric permittivity of free space, the wavelength and the speed of light in free space. $n_0'$, $n_0''$, $n_2'$ and $n_2''$ are the real and imaginary parts of the linear refractive index and real and imaginary parts of the nonlinear refractive index. If a system shows negligible absorption ($n_0'' \approx 0$), the real part of nonlinear refractive index $n_2$ will be proportional to the $\chi_R^3$ and the nonlinear absorption coefficient $\beta$ will be proportional to the $\chi_I^3$.

In the microscopic aspect, it is the third-order susceptibility that determine the value of the nonlinear refractive index. On the other hand, in the macroscopic aspect, there are several physical processes that will lead to nonlinear changes in the refractive index. In most materials, the total change in refractive index, $\Delta n$, is general given by $$\Delta n = \left(\frac{\delta n}{\delta T}\right)_\rho dT + \left(\frac{\delta n}{\delta T}\right)_T d_\rho^T + \left(\frac{\delta n}{\delta T}\right)_T d\rho^e$$

The first term, $$\left(\frac{\delta n}{\delta T}\right)_\rho dT$$

arises from the "internal temperature" change in the molecules caused by a very short pulsed laser, which modifies the spectral dependence of the molecular absorption and emission process. This effect generally occurs within the picoseconds or femtoseconds time scale. The second term, $$\left(\frac{\delta n}{\delta T}\right)_T dT$$

comes from a laser induced overall rise in temperature and the resulting change in the density. This thermal effect is likely to make a contribution to the nonlinear optical response for all but the shortest laser pulses. The third term, $$\left(\frac{\delta n}{\delta T}\right)_T d\rho^e$$

is due to electrostriction effects in non-absorbing materials, or the tendency of a material to move towards a region of high field strength, which is a pure density change effect that contributes in the case of a longer pulse.

Since the optical Kerr effect is dependent on intensity, in a homogeneous nonlinear nanocomposite materials, assuming materials thin in comparison to the photon absorption length, the refractive index will take the profile of the incoming light. For instance a flat-top beam will result in a flat-top refractive index profile change. Likewise, a Gaussian beam will result in a Gaussian refractive index profile and thus cause the light to focus.

In a heterogeneous refractive-index material including two- or three-dimensional gradient patterns, the input optical waveform encounters the refractive gradient profile, photon's speed change, via refraction, causing the optical path to change direction; such as can be predicted using Snell's law. Areas where the light is concentrated may experience higher optical radiation density and undergo a nonlinear response, wherein the optical index changes, thereby further modifying the light's optical path.

A typical figure of merit for third-order nonlinearities is given by:

$$F=\chi^3/\alpha\tau$$

where $\alpha$ is the linear absorption coefficient and $\tau$ is the response time.

Non-limiting examples of nanoparticles that exhibit the nonlinear optical effect include metal, semiconductor, and organic nanoparticles, including cadmium sulfide (CdS), cadmium telluride (CdTe), carbon nanotubes, fullerenes (C60), graphite, graphene oxide, and carbon nanoparticles, zinc oxide (ZnO) and titanium dioxide (TiO2) nanoparticles, gold (Au) and silver (Ag) metal nanoparticles, gold (Au) and silver (Ag) metal coated nanoparticles, silica and metal oxide capped gold (Au), copper (Cu), silver (Ag) metal nanoparticles, hybrid organic-inorganic nanoparticles bound to one or more NLO chromophores. Organic NLO nanofillers may include Stilbene-3, phyrins and derivatives, phthalocyanines, naphthalocyanines, and some other classes of chromophores exhibit dramatically enhanced NLO performance when incorporating a heavy metal atom (Pb, Au, Ag, Pt, Pd).

Possible origins of nonlinearity effects of the nanofillers may include intraband, interband, and hot-electron contributions. Intraband contributions are due to electron transitions within a single conduction band, where $\chi^3$ negative, imaginary is, and proportional to the inverse of the radius cubed. Interband contributions are due to electron transitions from the d-band to the s-conduction-band where, $\chi^3$ is negative imaginary and independent of size. Last, hot-electron contributions are due to non-equilibrium heating of the conduction band electrons, where $\chi^3$ is positive, imaginary, and independent of size.

The NLO nanofillers may also induce nonlinear response due to light induced plasmons or plasmonics. Plasmons occur when light interacts with the charge oscillations of the particle resulting in resonances between the light frequency and oscillation frequency. These resonances cause absorption and scattering, characterized by a resonant frequency (or wavelength), over a spectral bandwidth. The frequency of the resonances can be tuned by the nanoparticle's size, geometry and organic-host type. A result of light absorption may be localized heating, which can also impart nonlinear properties on the nanocomposites.

Also, dyes may be attached to metal or semiconductor nanoparticles to enhance intermolecular charge transfer from a donor toward an acceptor and dipole moments that result from non-symmetrical charge distribution.

The third-order non-linear susceptibility of the nanocomposite depends on the nanoparticle size and shape, the matrix, the resonant wavelength, the laser pulse spectral intensity, the laser pulse width, width and the volume fraction. The matrix generally referring to the organic-host, with or without nanoparticles. The optical properties (linear and non-linear) of nanofillers in a matrix are mainly dependent on the properties of the nanoparticles, the matrix in which the nanoparticles are embedded, and the interaction between the nanoparticles and the matrix. In addition, there are other factors that have to be taken into consideration. An important property that must be taken into account is the time-dependent dynamics of the NLO processes.

The applied electric field from the incident radiation is not the same electric field that polarizes the nanoparticle. The local field is an effective field that polarizes the individual nanoparticle, and its value depends on the polarization of the matrix, as well as the applied electric field. The local field factor provides a measure of how the average electric field in a given component of the composite is related to the spatially averaged electric field. The local field factor of the local field enhancement strongly depends on the refractive index and dielectric constant of the matrix. Therefore the choice of the matrix is a very important determinant of the non-linear optical properties.

The nanofillers can be bonded to the organic matrix of the EO-polymer by ionic bonds or covalent bonds to one or more monomers. Alternatively, nanoparticles can be added without bonding to the organic-matrix.

Organic and inorganic coatings can be placed on the nanofillers to promote steric hindrance and to enhance the bonding of the nanofillers to one or more of the monomers, to the nanofillers, or to other nonlinear process enhancing organic and inorganic entities. Inorganic chemical coatings are generally optimized to achieve high nanofiller loading densities, and to prevent agglomeration of the nanofillers, during ink synthesis, deposition, and curing.

The nanoparticle density may be enhanced by movement of nanoparticles during high intensity light, such that the local density of nanofillers is changed. Thermally activated ligands can be used to enhance this effect.

The NLO nanoparticles may scatter light via nonlinear refractive index changes, which can be modulated by the amount of doping of the NLO nanofillers, absorption characteristics of the NLO nanofillers, charge transfer between them, by the shape and structure of the NLO nanofillers, by any organic and inorganic shells around the NLO nanofillers, by the dielectric properties of the organic host materials, by the density of the NLO nanofillers in the ink matrix, and by the pattern that the NLO inks are deposited relative to the linear nanocomposite regions.

Scattering effects can be caused by the optical nonlinear effects. For instance, the NLO nanocomposite-inks can be deposited in discrete areas, the areas large enough to scatter light, but not when index matched to the other nanocomposite-ink or organic host regions. Under low light intensity, the NLO regions are not apparent, but when exposed to high intensity light, the complex refractive index of the NLO nanocomposite-ink may change via the optical Kerr effect, and the resulting refractive index contrast between the linear nanocomposite regions and the NLO nanocomposite regions become apparent due to the resulting complex refractive index mismatch between the linear and NLO regions, thereby absorbing, scattering or both scattering and absorbing light. The volumetric patterning of the linear and NLO regions of a device may be structured to promote NLO scattering.

Under high intensity light, focus changes may result from the patterning of linear and NLO nanofillers. The change in optical index at higher flux densities may cause a change in the refractive index gradients for one or more spectral bands of light, due to optical dispersion, which may cause all or a portion of the spectra to focus at a distance longer or shorter than the focal points measured under low intensity light.

Figure 2A:
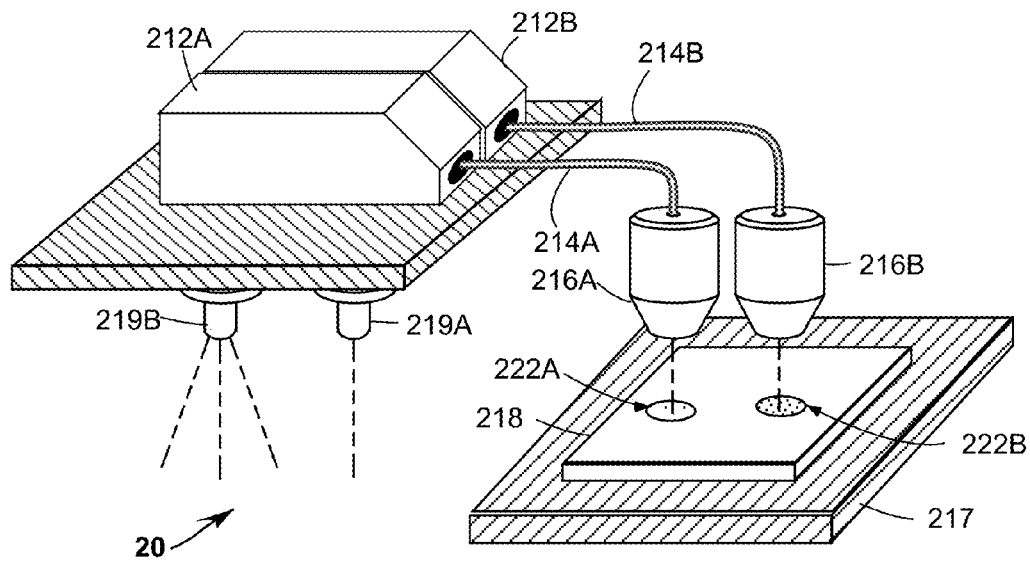
FIG. 2A is a perspective view, schematically illustrating an inkjet printer for printing nanocomposite-ink.

A preferred method of manufacture for the nonlinear nanocomposite optical-element is by ink-jet printing technology, described below. FIG. 2A shows an ink-jet printing apparatus 20A for deposition of nanocomposite-ink in accordance with the present disclosure. Printing apparatus 20A is simplified for explanatory purposes. Those skilled in the art will generally recognize the ink-jet printing approach, see Richard Chartoff et al., "Functionally Graded Polymer Matrix Nano-Composites by Solid Freeform Fabrication," presented at the 2003 Solid Freeform (SFF) symposium and Richard Chartoff et al., "Polymer Matrix Nanocomposites by Ink jet Printing" presented at the SFF symposium in 2005.

Printing apparatus 20A has a reservoir 212A and a reservoir 212B that hold nanocomposite-ink 222A and 222B, respectively. Reservoirs 222A and 222B provide a printing-head 216A and a printing-head 216B with a nanocomposite-ink 222A and 222B, fed via feed-lines 214A and 214B, respectively. Printing-heads 216A and 216B deposit nanocomposite-ink 222A and 222B, on a substrate 218 at particular voxels, thereby forming a nanocomposite structure, such as the optical-elements of the present disclosure. Voxels refer to positions in three-dimensional space. A stage 217 positions a substrate 218, with respect to the printing-heads, for deposition of the nanocomposite-inks at particular voxels.

Substrate 218 can be, or be made, from the group comprising plastics, glasses, metals, ceramics, organic resins, optics, molds, electronic circuits, wafers, and wafers with integrated electronics. Substrate 218 can become part of the optical element or alternatively the optical-element may be removed from the substrate. For applications in which the substrate becomes part of the optical-element, the substrate may be chosen for specific properties. For example, in applications where the optical-element is absorbing light and converting light to heat, the substrate material may be a thermally conductive metal acting as a heat sink. Alternatively, the substrate may be a mold material with anti-sticking properties, allowing removal of the optical-element from the mold.

After deposition of nanocomposite-ink from one of the printing-heads, substrate 218 can be positioned with respect to a radiation source 219A for selective-curing of the nanocomposite-ink, at voxels. Selective-curing refers to localized radiation about voxels, activating the organic-host matrix. Activation of the organic-host matrix solidifies the nanocomposite-ink. Selective-curing means zero-curing, partial-curing, or fully-curing, which respectively means not solidifying, partially solidifying, or fully solidifying the nanocomposite-ink. Another radiation source 219B flood cures the nanocomposite-ink on the substrate. Flood curing is desirable when the all the nanocomposite-ink needs to be partially or fully cured.

Figure 2B:
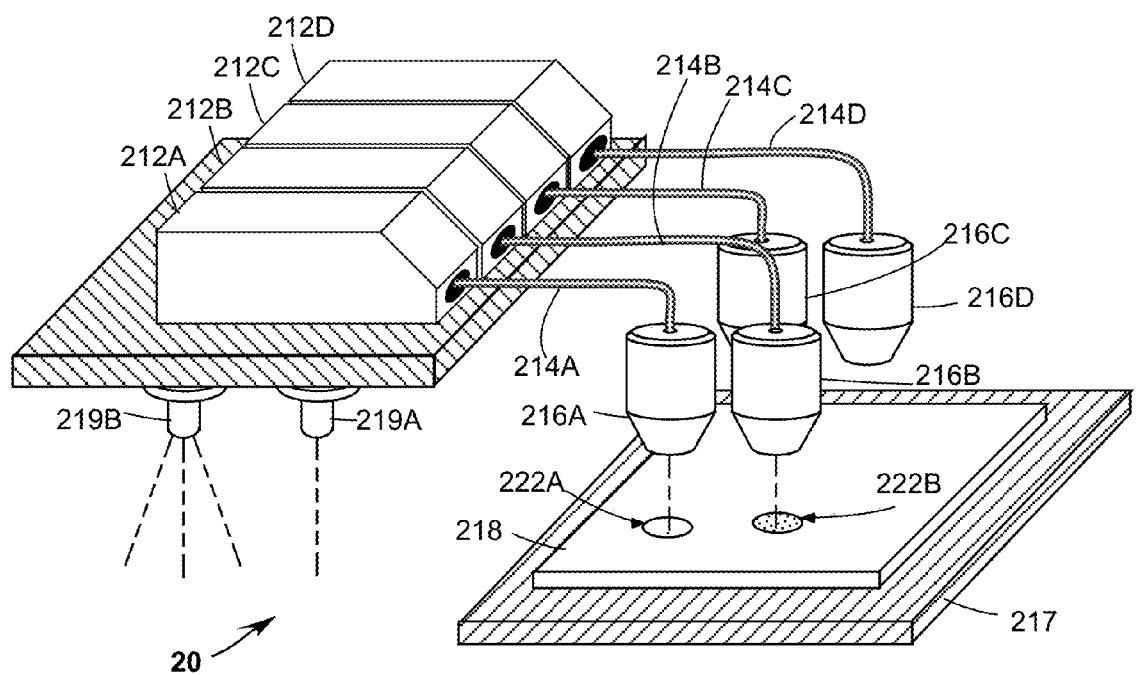
FIG. 2B is a perspective view of that shown in FIG. 2A with two additional printheads.

FIG. 2B illustrate a printing apparatus 20B shown in FIG. 2A with an additional reservoirs 212C and a reservoir 212D, holding a nanocomposite-ink 222C and a nanocomposite-ink 222D, a feed-line 214C and a feed-line 214D, and a printing-head 216C and a printing-head 216D. The additional printing heads provide additional nanocomposite-ink different from the nanocomposite-ink in other printing heads. For instance, one of the reservoirs can hold the NLO nanocomposite-ink optimized for nonlinear refraction effects, another can hold the NLO nanocomposite-ink for the nonlinear absorption effects, yet another can hold the nanocomposite-ink with linear susceptibility, last one can hold an metal nanocomposite-ink or absorbing ink jet printable material, as will be described further hereinbelow. Alternatively, the nanofillers and the organic-host can be chosen for other properties such as dielectric strength, thermal conductivity, electrical conductivity, coefficient of thermal expansion, or mechanical stability. Further, reservoirs can isolate the nanofillers and the organic-host and mix on demand for various nanofillers concentrations from any one of the printing heads.

FIG. 2C schematically illustrates a nanocomposite deposition 21C, giving further detail of the deposition of the nanocomposite-ink shown in FIGS. 2A and 2B. Nanocomposite-ink 222A, deposited on substrate 218 is bounded by a nanocomposite-air interface 226A. The nanocomposite-ink consists of the organic-matrix with a dispersed nanofillers 224A throughout the organic-matrix. The organic-matrix is ink-jet printable, optically clear, photo-curable resin. Four non-limiting examples of printable organic-matrix material for are cyanoethyl pullulan (CYELP), polyacrylate, hexanediol diacrylate (HDODA), polymethyl methacrylate (PMMA), diethylene glycol diacrylate (DEGDA), cellulose, and organic resins such as from the SU-8 series resists. The nanofillers with high-order nonlinear susceptibility aforementioned and the nanofillers with linear susceptibility are preferably sized sufficiently small with respect to light wavelengths, for those wavelengths intended for use, not to scatter the light. The nanocomposite-inks can be different by the nanofiller type, the organic-host matrix type, or concentration of the nanofillers and combinations thereof. The nanofillers include those with core, core-shell, and core-shell-ligand architectures. The refractive-index within the optical-element can be modified by the nanocomposite-ink used. The nanocomposite-ink can be tuned by the organic-matrix type, the nanofiller type, and the concentration of the nanofillers in the organic-matrix. The refractive-index of a nanocomposite-ink will be the summation by percent volume of the optical properties of the organic-matrix, or organic-host, and the nanofillers. Concentration by volume of the nanoparticles to the organic-host can be about 0.25% to about 70% volume, depending on desired properties. Various examples of nanoparticle and organic-matrix combinations and chemistries is described in U.S. patent application Ser. No. 14/036,660, assigned to the assignee of the present disclosure and the complete disclosure of which is hereby incorporated by reference in its entirety. Further nanocomposite-ink can be chosen and the optical-element structured to compensate chromatic aberration or increase chromatic dispersion, see Pat. Application No. PCT/US2014/278164, assigned to the assignee of the present disclosure and the complete disclosure of which is hereby incorporated by reference in its entirety.

FIG. 2D schematically illustrates a nanocomposite structure 21D, similar to that shown in FIG. 2C with an additional deposit of a nanocomposite-ink 222B at a voxel above the voxel of nanocomposite-ink 222A. Here, nanocomposite-ink 222B is shown after deposition, characterized by a dispersed nanofillers 226B, aink-ink interface 228A (where mixing between nanoparticle-inks has not yet occurred), and a air-ink interface 226B.

FIG. 2E schematically illustrates a nanocomposite structure 21E, similar to that shown in FIG. 2D, wherein the selective-curing of nanocomposite-ink 222A before deposition of nanocomposite-ink 222B was zero-curing. A nanocomposite-ink 230 is the resultant mixture of uncured nanocomposite 222A and 222B. Nanocomposite-ink 230 is characterized by a air-ink interface 232 and nanofillers 224A and 224B dispersed within. A refractive-gradient between the top and bottom of nanocomposite-ink 230 depends on convective mixing resulting from relative size, velocities, and nanofiller concentrations between the nanocomposite-inks, any partial-curing of nanocomposite-ink 222A drop before deposition of nanocomposite-ink 222B, the temperature of the substrate, and time allowed for diffusion of nanofillers from nanocomposite-inks 222A and 222B, before additional partial-curing of the nanocomposite-inks.

FIG. 2F schematically illustrates a nanocomposite structure 21F, similar to that shown in FIG. 2D wherein nanocomposite 222A was partially cured. Here, partial-cure of nanocomposite 222A results in a gradient-area 222B between nanocomposite 222A and 222B. The extent of gradient-area 222B depends on the selective-cure of nanocomposite-ink 222A. Zero-curing allows mixture of the nanocomposite-inks as exemplified in FIG. 2E. Partial-curing allows diffusion in a limited gradient area 228A as exemplified in FIG. 2F. Fully-curing allows little diffusion and results in a substantially ink-ink interface 228A as exemplified in FIG. 2D. In addition to controlling gradient-areas, partial-curing before subsequent deposition reduces stress and strain in the resultant optical-element.

Figure 2G:
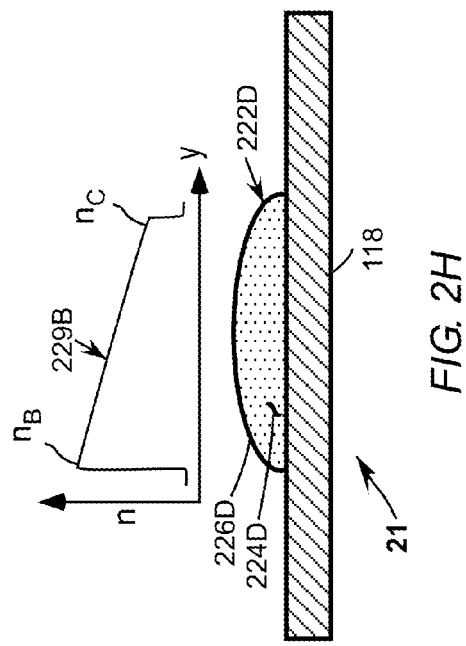
FIG. 2G is a cross-section view, schematically illustrating deposition of the nanocomposite-ink side-by-side.

FIG. 2G schematically illustrates a nanocomposite structure 21G shown in FIG. 2A and FIG. 2B where the nanocomposite-ink is deposited side-by-side. Here, nanocomposite-ink 222B with nanofillers 224B and ink-air interface 226B is deposited along the side of a ink 222C. ink 222C has no nanofillers bound by air-interface 226C.

Figure 2H:
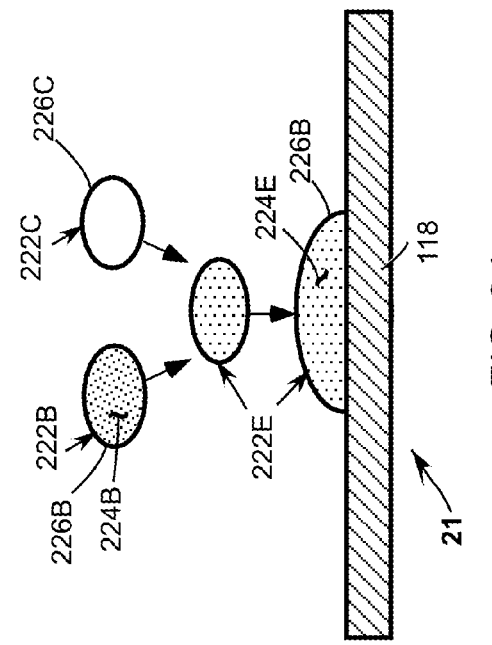
FIG. 2H is a cross-section view, schematically illustrating that shown in FIG. 2G, where nanocomposite-ink mixing resulted in a slow transition in the refractive-gradient profile.

FIG. 2H schematically illustrates a nanocomposite structure 21H, similar to that shown in FIG. 2G, except nanocomposite-ink 222B has mixed with nanocomposite 222C resulting in a gradient nanocomposite 222D. Here nanocomposite gradient 222D is bounded by a ink-air interface 226D, has a nanofillers 224D, the same nanofillers as nanocomposite-ink 222B, distributed according to a refractive-gradient profile 229B. The gradient is a result of mixture of the nanocomposites where the partial-curing of nanocomposite 222B was minimal and aforementioned convective mixing and time was allowed before further partial-curing. Refractive-gradient profile 229B is characterized by a high refractive-index $n_B$, the high refractive-index due to higher concentration of nanoparticles 224D, the refractive-gradient's refractive-index slowly and smoothly transitioning in the y-direction to a low refractive-index $n_C$, the low refractive-index due to the low concentration of nanoparticles 224D.

Figure 2I:
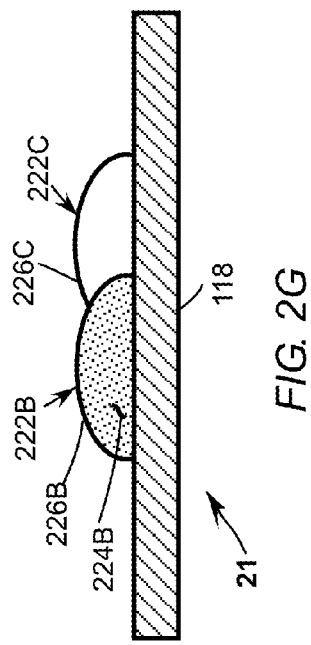
FIG. 2I is a cross-section view, schematically illustrating that shown in FIG. 2G, where nanocomposite-ink mixing resulted in a fast transition in the refractive-gradient profile.

FIG. 2I schematically illustrates the nanocomposite structure 21I similar to that shown in FIG. 2G, except nanocomposite-ink 222B has been partially-cured before deposition of nanocomposite-ink 222C. Here partial-cure of nanocomposite-ink 222B, results in limited mixing of nanocomposite-ink 222C at interface 224AB, resulting in a refractive-gradient 229C. Refractive-gradient profile 229C is characterized by high refractive-index $n_B$, the high refractive-index due to higher concentration of nanoparticles 224D, the refractive-gradient's refractive-index unchanging in the y-direction until quickly transitioning to low refractive index $n_B$ at former interface 224AB. Alternatively, refractive-gradient profile 229C could be produced without partial-curing of nanocomposite-ink 222B, before deposition of nanocomposite 222C, by limiting the aforementioned mixing factors, such as controlling nanocomposite-ink deposition velocities, and limiting diffusion temperature control of the substrate, and curing the deposited nanocomposite-inks within a controlled time.

Figure 2J:
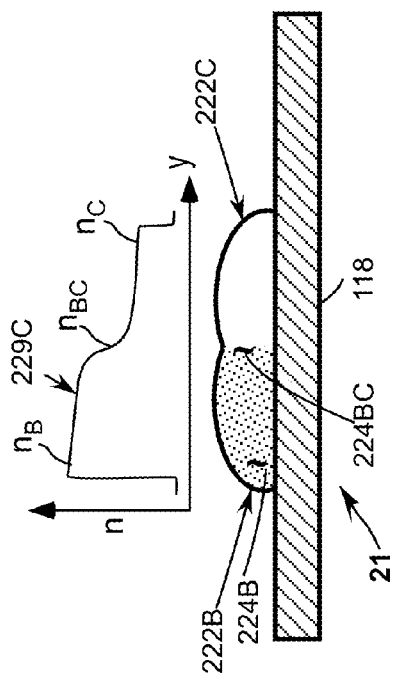
FIG. 2J is a cross-section view, schematically illustrating mixing of nanocomposite-inks in air.

FIG. 2J schematically illustrates a nanocomposite-ink mixing method 21J. A nanocomposite-ink 226B and a nanocomposite-ink 226C are deposited such that the respective printing heads are aligned to cause the nanocomposite-ink to mix in air creating a nanocomposite-ink 222E. Nanocomposite-ink 222E, then deposits, mixed, onto substrate 118 with nanofillers 224E bounded by a ink-air interface 226B.

Figure 3A:
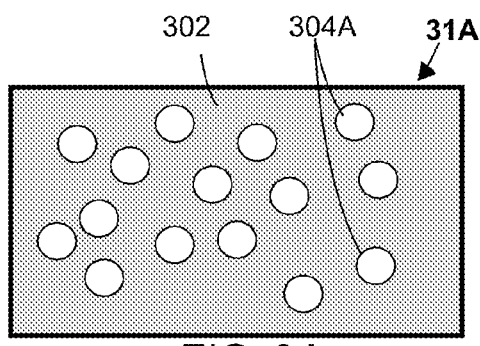
FIG. 3A is a schematic illustrating distribution of the linear nanofillers in an organic host.
Figure 3B:
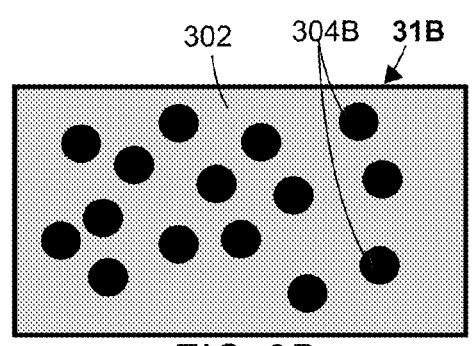
FIG. 3B is a schematic illustrating distribution of the NLO nanofillers in an organic host.
Figure 3C:
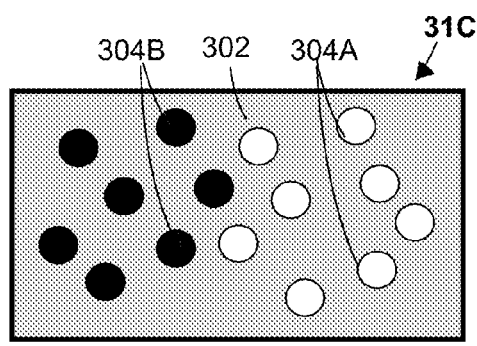
FIG. 3C is a schematic illustrating distribution of the linear and the NLO nanofillers in the organic host, where they are separated.
Figure 3D:
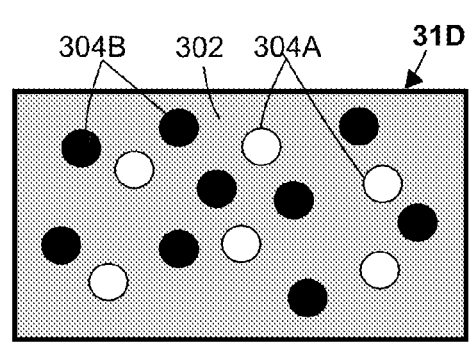
FIG. 3D is a schematic illustrating distribution of the linear and the NLO nanofillers in the organic host, where they are intermixed.

FIG. 3A, FIG. 3B, FIG. 3C, and FIG. 3D schematically illustrates distribution and intermixing in the nanocomposite optical-element. The high order NLO nanoparticles are drawn black and the linear nanofillers are drawn white. While the nanoparticles are shown as schematically shown circular, other shapes and structures are common. Further grouping of the black nanofillers may comprise of different types of NLO nanofillers, likewise grouping of white nanofillers comprise of different types of linear nanofillers. Referring to FIG. 3A, a nanocomposite 31A has a organic-host 302 with a linear nanofillers 304A. The nanofillers can be bond to the organic-host or not. Referring to FIG. 3B, a nanocomposite 31B has a organic-host 302 with a NLO nanofillers 304B. Referring to FIG. 3C a nanocomposite 31C has organic host 302 with both linear nanofillers 304A and NLO nanofillers 304B, where intermixing between the nanoparticles has been limited on deposition techniques aforementioned. Referring to FIG. 3D, a nanocomposite 31D has that shown in FIG. 3C, but here the linear and the NLO nanofillers are fully intermixed. The nanofillers are drawn floating in the organic-host, and may intermixed without bond to the organic-host, but are typically bound to the organic-host as previously mentioned and described in further detail below.

Figure 3E:
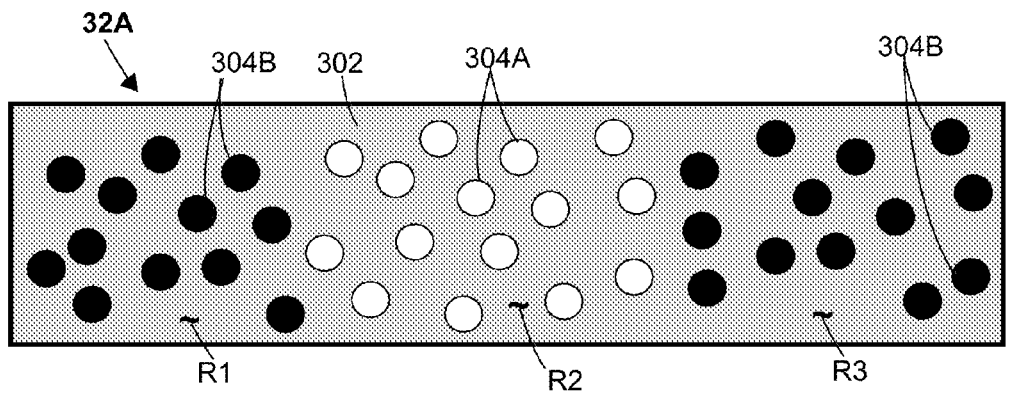
FIG. 3E is a schematic illustrating distribution of the linear and the NLO nanofillers in the organic host in three regions.
Figure 3F:
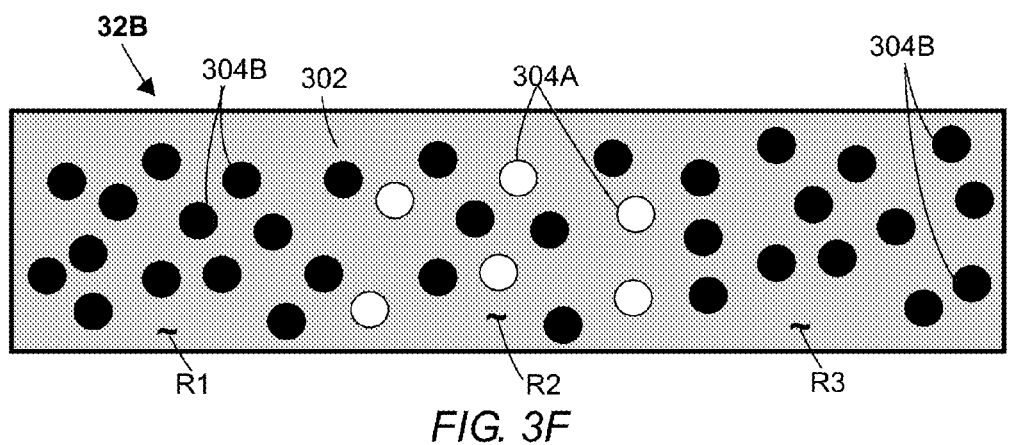
FIG. 3F is a schematic illustrating distribution of the linear and the NLO nanofillers in the organic host in three regions where mixing has occurred in the second region.
Figure 3G:
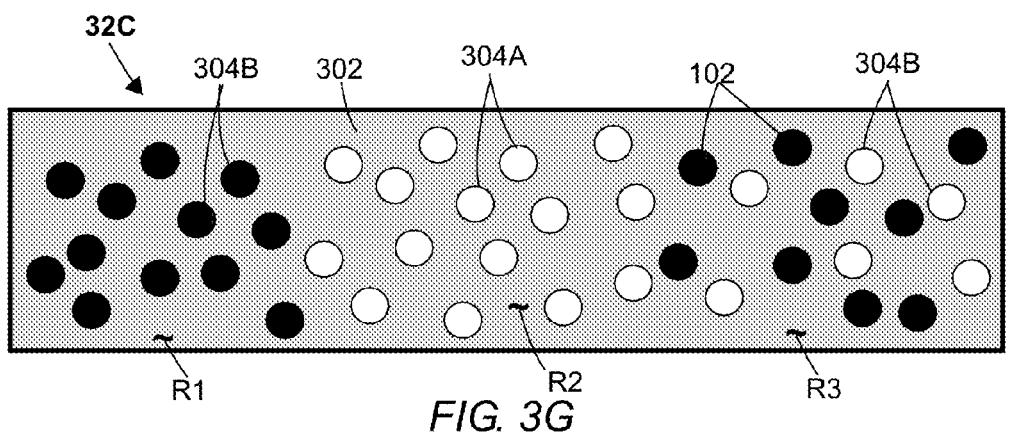
FIG. 3G is a schematic illustrating distribution of the linear and the NLO nanofillers in the organic host in three regions, where mixing has occurred in the third region.

FIG. 3E, FIG. 3F and FIG. 3G schematically illustrates further detail of distribution and intermixing of the nanofillers within the optical-element. Referring to FIG. 3E, a nanocomposite 32A has a group of NLO nanofillers 304B in a region R1 and a region R3 on either side of a group of linear nanofillers 304A, in region R2, where little mixing has occurred. Referring to FIG. 3F, a nanocomposite 32B has that shown in nanocomposite 32A, except here mixing of the linear and the NLO nanofillers has occurred in region R2. Referring to FIG. 3G, a anocomposite 32C has group of NLO nanofillers 304B in region R1 where no mixing has occurred, region R2 has a group of linear nanofillers where no mixing has occurred, and region 3 has a mixture of the linear and the NLO nanofillers.

FIG. 3H and FIG. 3I schematically illustrate bonds of the linear and NLO nanofillers to the organic-host. A bond structure 33A has a polymer host 306 bound to linear nanofiller 304A, via a ligand 308A, the nanofiller with moiety optimized for monomer-ligand bond via ligand 308A. Structure 33A is shown with a linear nanofiller, but a NLO nanofiller could be bound similarly. A structure 33B has nanofiller 304A bound to a organic-host polymer 306, via ligand 308A, the ligand with moiety optimized for monomer-ligand bond. Additionally structure 33B has NLO nanofiller 304B bound to organic-host polymer 306, via ligand 308B, the ligand with moiety optimized for monomer-ligand bond.

FIG. 3J and FIG. 3K, schematically illustrates detail of NLO nanofiller acceptor-donor structures. A NLO structure 34A bound to a ligand 314A via an anchor 316A. The anchors representing moiety with functionality optimized for monomer-ligand. Ligand 314A is also bound to a donor molecule 312 via anchor 316D resulting in an acceptor-donor electron interaction between the donor and the acceptor molecules, which in turn allows for more complex nonlinear energy processes such as two, three, and four level nonlinear energy processes. Donor molecule 312 is bound to organic-host polymer 306 with a ligand 314B via an anchor 316D to the donor and a buoy 316P to polymer 306. The buoys having representing moiety with functionality optimized for ligand-polymer. Referring to FIG. 3K, a structure 34B is similar to that shown in FIG. 3J, except that the donor and acceptor molecule's position, as well as their respective anchors, are exchanged.

FIG. 3L and FIG. 3M, schematically illustrates a NLO nanofiller acceptor-donor structure 34C and 34D, respectively. NLO structure 34C has acceptor 310 bound to a ligand 314C via anchor 316A. Similarly, donor 312 is bound to the ligand 314C, via a anchor 316D. Ligand 314C is bound to organic-host polymer 306 via buoy 316P. Similar to the structures shown in FIGS. 3J and 3K, structure 34C results in the acceptor-donor electron interactions and allows for more complex nonlinear energy processes. Structure 34D is similar to that shown in FIG. 3L, except the donor and acceptor molecule's position, as well as their respective anchors, are exchanged. One skilled in the art could recognize that in addition to the configurations shown, more complex structures and combinations of structures can be made to create other acceptor-donor NLO interactions.

Figure 4A:
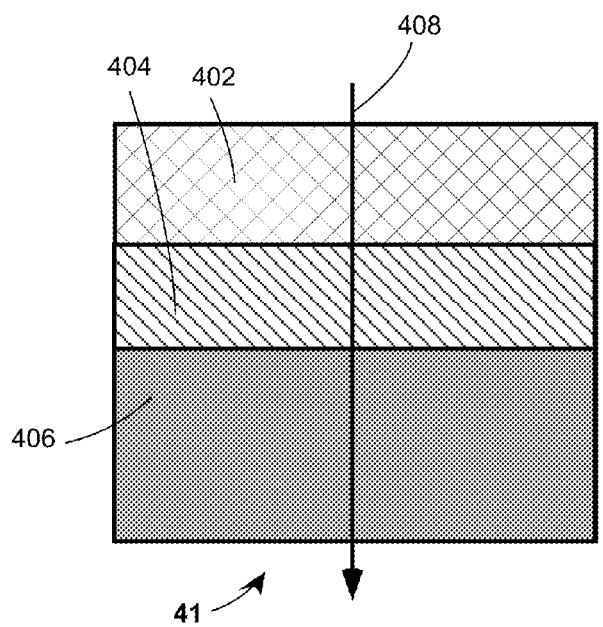
FIG. 4A is a schematic illustrating distribution of a tiered optical-element in accordance with the present disclosure, where the optical-element exhibits a plurality of high-order nonlinear effects.

FIG. 4A schematically illustrates a tiered optical-element 41 in accordance with the present disclosure. FIG. 4A shows a light ray 408 transmitting through an optical-element 41. Optical-element 41 has an absorbing layer 402, a scattering layer 404 and a nonlinear refractive layer 406. Tiering of the optical-element with various nonlinear absorption mechanism allows for more complex optical limiter design. For instance a lower intensity threshold can be made. When the incident light has intensity above the threshold of the first layer, absorption via nonlinear effects, scattering, and directional change or self-focusing, limits optical throughput.

Figures 4B, 4C:
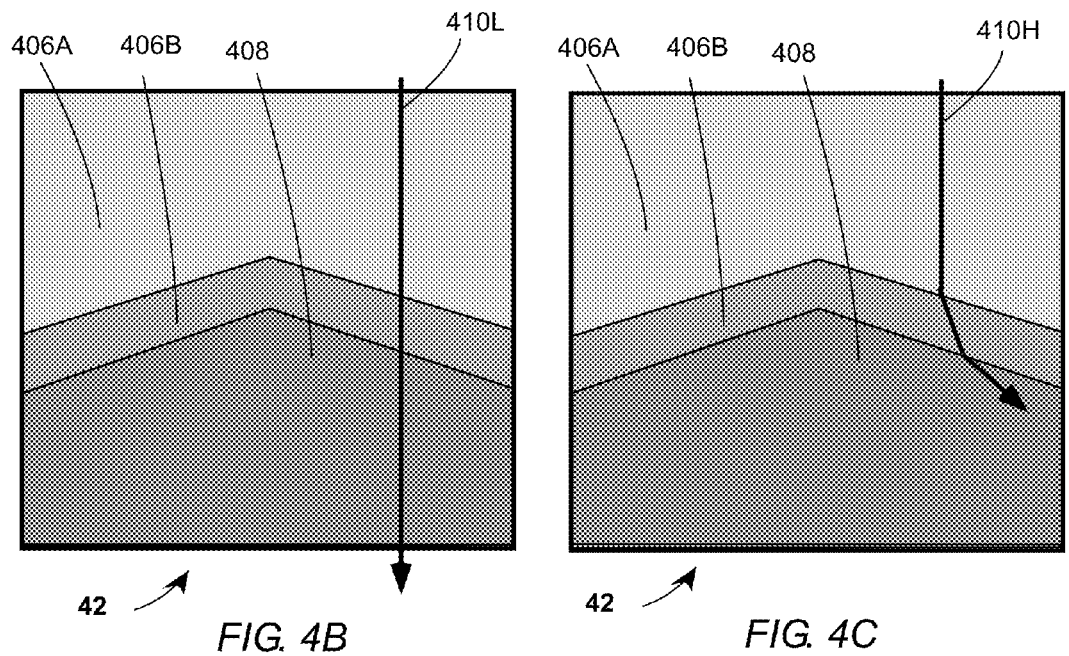
FIG. 4B is a cross-section view, schematically illustrating the optical-element in accordance with the present disclosure, where the optical-element, where optical limiting is achieved by the optical Kerr effect combined with nanofiller distribution.
FIG. 4C is a cross-section view, schematically illustrating that shown in FIG. 4B where a high-intensity light passes through the optical-element.

FIG. 4B and FIG. 4C schematically illustrate an optical-element 42 where the limiting mechanism is the optical Kerr effect combined with nanofillers distribution. Optical-element 42 has a NLO nanocomposite region 406A with high concentration of NLO nanofillers, a NLO nanocomposite region 406B with lower concentration of NLO nanofillers, and a linear nanocomposite region 408 with no NLO nanofillers. Interfaces between each of the regions are angular tapered from the optical-axis like that of an axicon. All the regions are index-matched when no NLO effect is exhibited. Referring to FIG. 4B, a low intensity beam 410L propagates through the optical-element without refraction at the index matched interfaces. Referring to FIG. 4C, a high intensity beam 410H causes an refractive index change in region 406A such that region's refractive index is higher than layer 406B. Region 406B's refractive-index also increases, higher than region 408, but lower than region 406A. The high intensity beam 410H refracts at the interfaces away from the optical axis. Alternatively, the aforementioned linear nanocomposite regions may be another of the NLO nanocomposite regions, the NLO regions having different NLO nanofillers, NLO nanofiller concentration, organic-matrix, or combinations thereof.

Figure 4D:
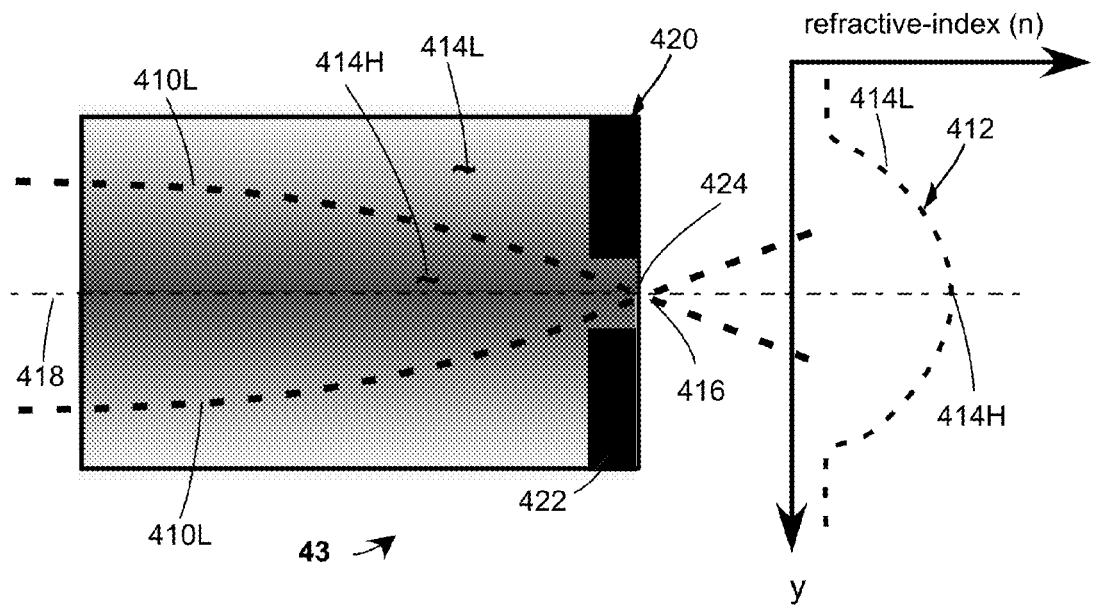
FIG. 4D is a cross-section view, schematically illustrating an aperture optical-element in accordance with the present disclosure.
Figure 4E:
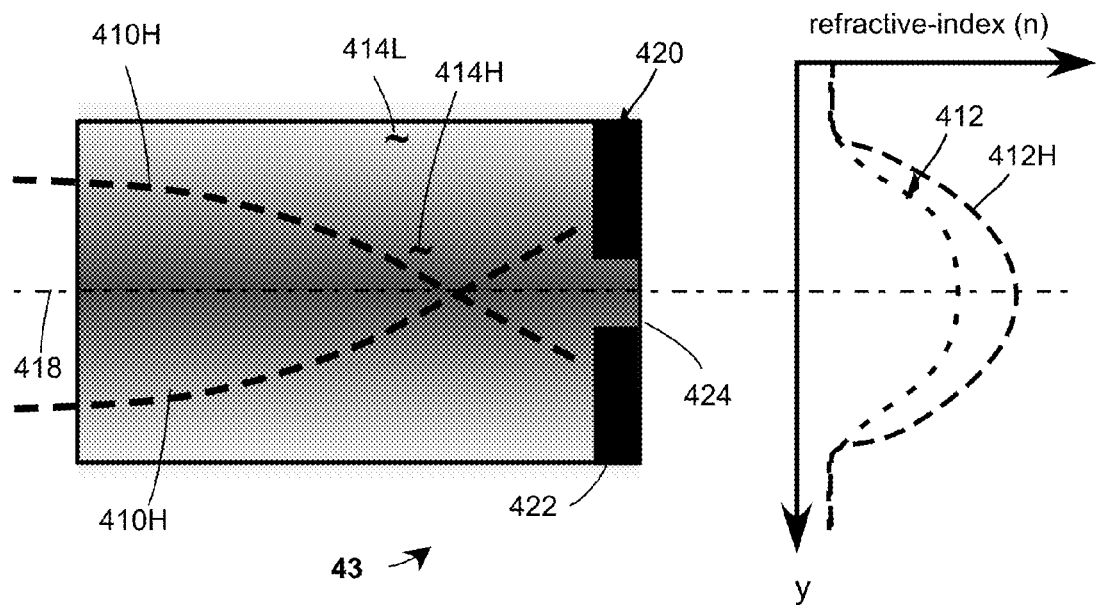
FIG. 4E is a cross-section view, schematically illustrating that shown in FIG. 4D wherein the light is high-intensity.

FIG. 4D and FIG. 4E schematically illustrate an optical element 43, where the limiting mechanism is the optical Kerr effect and an aperture 424. Optical-element 43 has a mixture of both linear and nonlinear nanofillers, the nonlinear nanofillers having exhibiting the optical Kerr effect. The distribution of the nanofillers is such that the optical element has a parabolic refractive profile 412, with a lower nanofiller concentration 414L and a higher nanofiller concentration 414H. The optical-element has aperture 420 with a opaque material 422 and an opening 424. Referring to FIG. 4D, a low-intensity light beam 410L enters the optical-element and focuses, due to the parabolic refractive profile focuses at aperture opening 424, exiting the optical element attenuated. Referring to FIG. 4E, a high-intensity light beam 410H enters the optical element and, due to the optical Kerr effect, the refractive profile changes from profile 412 to a higher index profile 412H, thereby focusing beam 410 at a distance before the aperture. Focus of beam 410H before the aperture causes part of beam 410H to miss aperture opening 424, the light being spatially filtered via absorption or reflection by opaque material 422, thereby attenuating the beam.

The aperture is preferably made from an ink jet printable metal-ink or a carbon based ink. The carbon based nanocomposite-ink can be formed from high concentration of carbon particles in an organic host. Carbon particles can be sized larger than nanoparticles, but small enough to be ink jet printable The metal nanocomposite-inks are suspensions of metal nanoparticles such as silver and copper. A variety of the metal-inks are commercially available at a variety of manufacturers, for example, silver based nanocomposite-inks are available at Novacentrix in Austin, Tex. in The United States, Cabot Corporation in Boston, Mass. in The United States, and Samsung ElectroMechanics in Suwon, Gyeonggi-do in South Korea.

The metal-ink has an optional sintering process in order to create continuous connectivity of the conductive nanoparticles. The sintering process can include implementation of a furnace to increase the temperature of the conductive-ink. Temperature of the optical-element must be kept below the glass transition of the polymers. Preferably the temperature of the optical-element is kept below 100° Celsius (C). A number of techniques can be implemented to avoid high temperatures while allowing continuous connectivity of the conductive nanoparticles. Hydrochlorides solutions can be used to dissolve chemical coating on the nanoparticles. Direct localized heating of the conductive-inks can be achieved through direct resistive heating. Pulsed light can sinter the material via pulsed ultraviolet xenon arc lamps, near infrared, or other radiation sources.

Figure 4F:
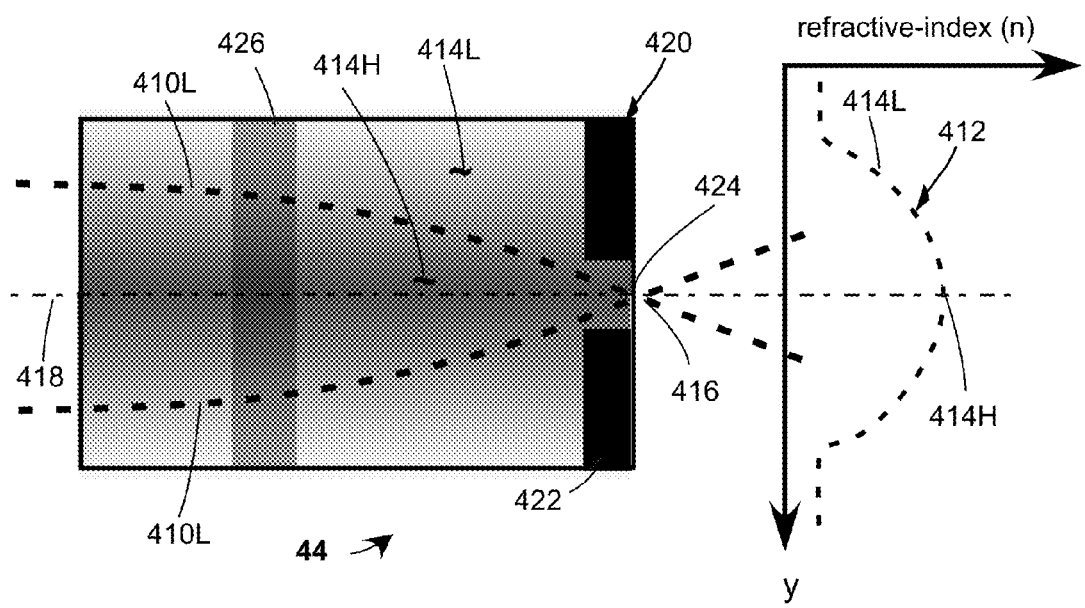
FIG. 4F is a cross-section view, schematically illustrating that shown in FIG. 4D, wherein the NLO nanofillers are confined to a region.
Figure 4G:
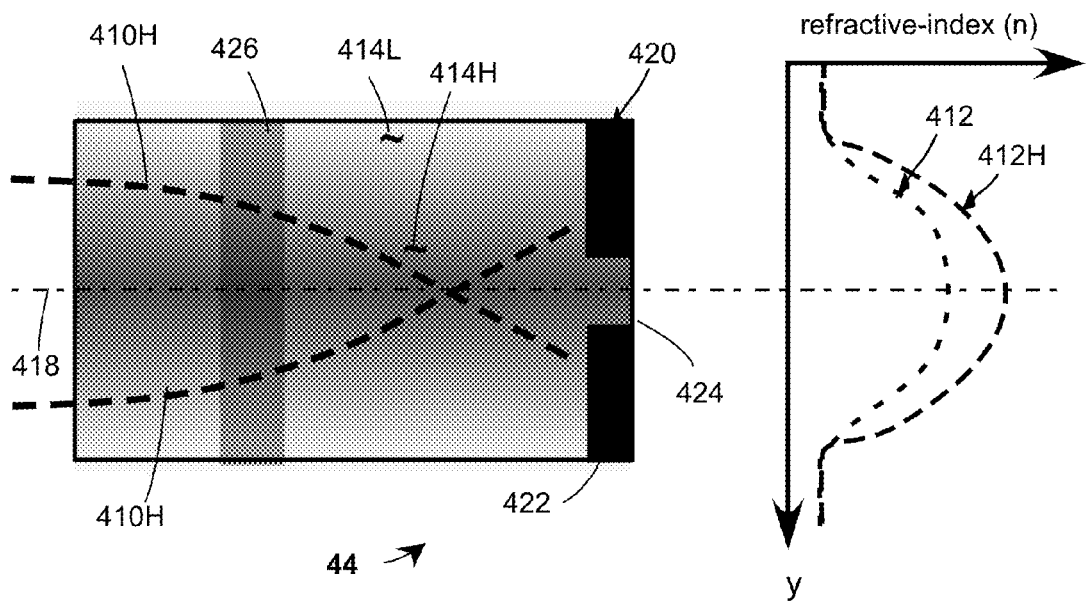
FIG. 4G is a cross-section view, schematically illustrating that shown in FIG. 4F, wherein the light is high-intensity.

FIGS. 4F and 4G schematically illustrate a optical-element 44. Optical-element 44 is the same as that shown in FIG. 4D and FIG. 4E, with the exception that here the NLO nanofillers are not mixed with the linear nanofillers, but are confined in a NLO region 426. The refractive profile in region 426 is parabolic and the effect of the high intensity light beam the same, except the increased focusing is primarily in region 426, the increased focusing causing spatial filtering at the aperture.

Figure 4H:
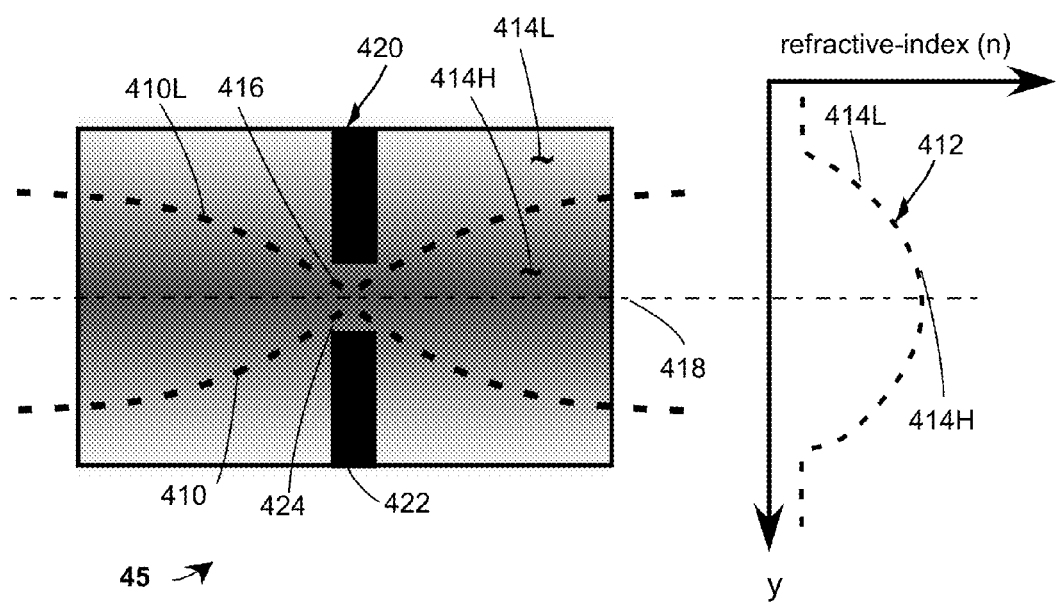
FIG. 4H is a cross-section view, schematically illustrating that shown in FIG. 4D, further including an additional linear nanocomposite region symmetric about the aperture.
Figure 4I:
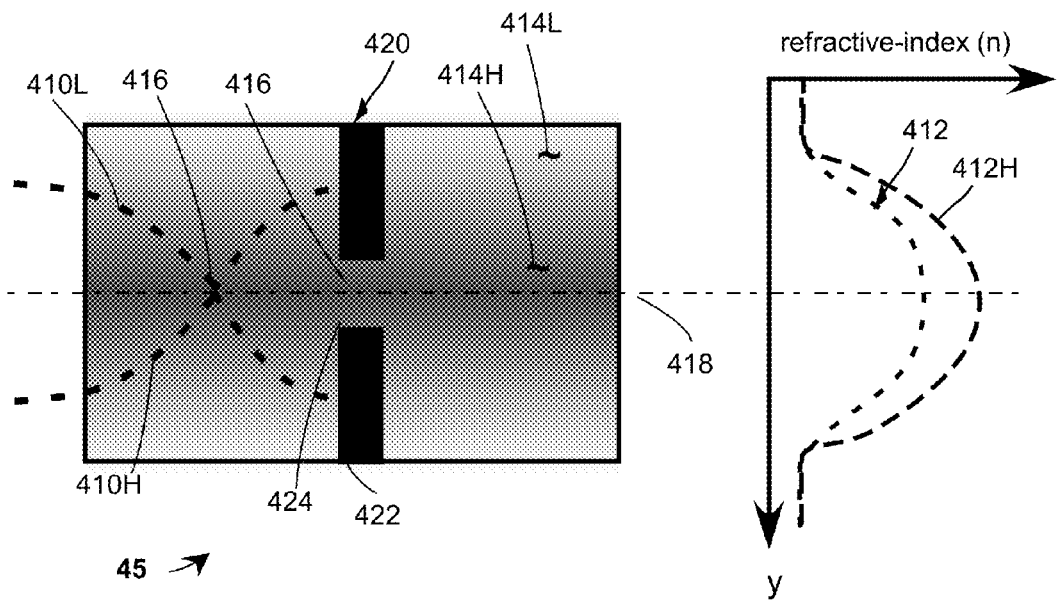
FIG. 4I is a cross-section view, schematically illustrating that shown in FIG. 4H, wherein the light is high-intensity.

FIGS. 4H and 4I schematically illustrate an optical element 45. Optical-element 45 is similar to that shown in FIG. 4D and FIG. 4E, further including nanocomposite material symmetric about aperture 420, the collimated light entering the optical-element, such as low-intensity beam 410L focuses at aperture 420 and is collimated by the symmetric nanocomposite material. Again, high intensity beam 410H is spatially aperture via increased refractive-index.

For the aforementioned NLO structures, light has been shown incident on the optic and filtered via nonlinear effects induced by the light shown. Another approach to induce the nonlinear effects is use a pump beam. The pump beam can be delivered at an oblique angle, with intensity sufficient to cause the nonlinear effects, while the light does not change in intensity. This pump method allows for manipulation of the nonlinear effects independent from other light sources.

Figure 4J:
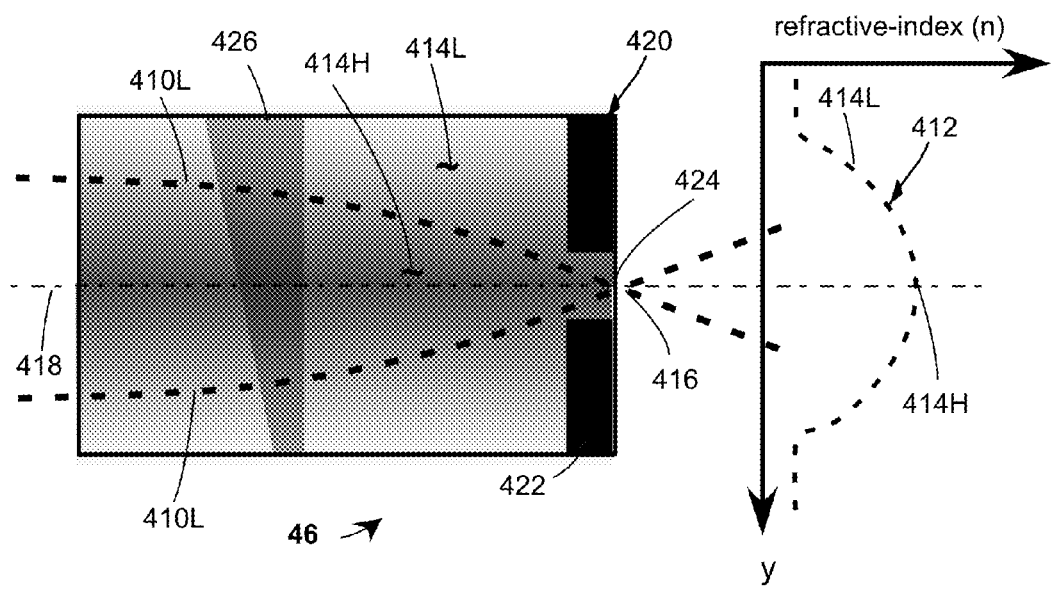
FIG. 4J is a cross-section view, schematically illustrating that shown FIG. 4F, wherein the NLO region is prism shaped.
Figure 4K:
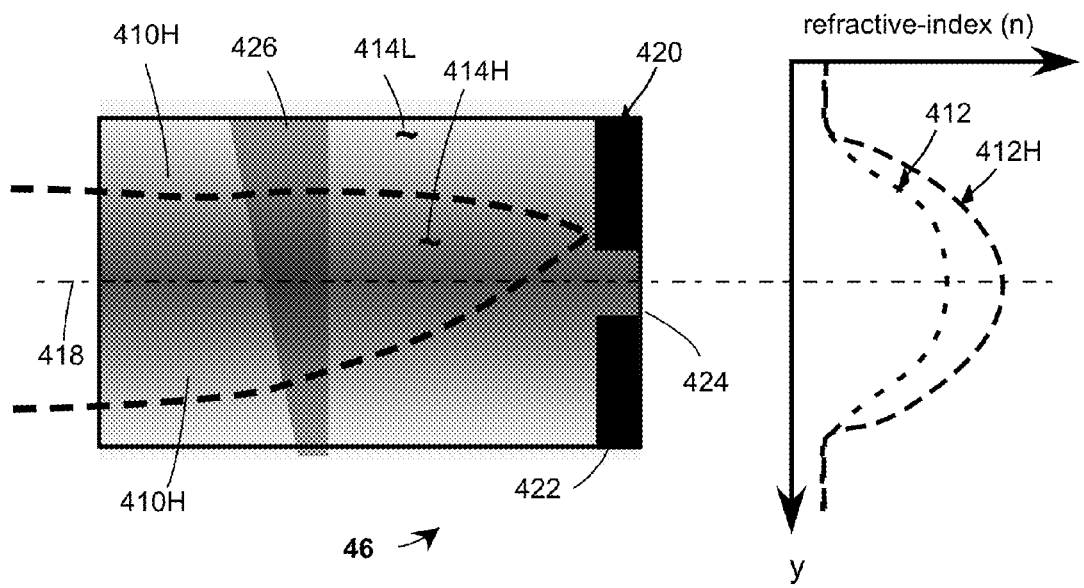
FIG. 4K is a cross-section view, schematically illustrating that shown in FIG. 4J, wherein the light is high-intensity.

FIGS. 4J and 4K, schematically illustrate an optical element 46. Optical-element 46 is the similar to that shown in FIGS. 4F and 4G, except here NLO region 426 is prism shaped. Low-intensity light 410L focuses through the aperture, without attenuation. High-intensity light 410H causes an increase in refractive index of NLO region 426, the prism shape directing the light to focus off-axis onto aperture material 422, thereby blocking all high-intensity light from exiting the optical-element.

Figure 5A:
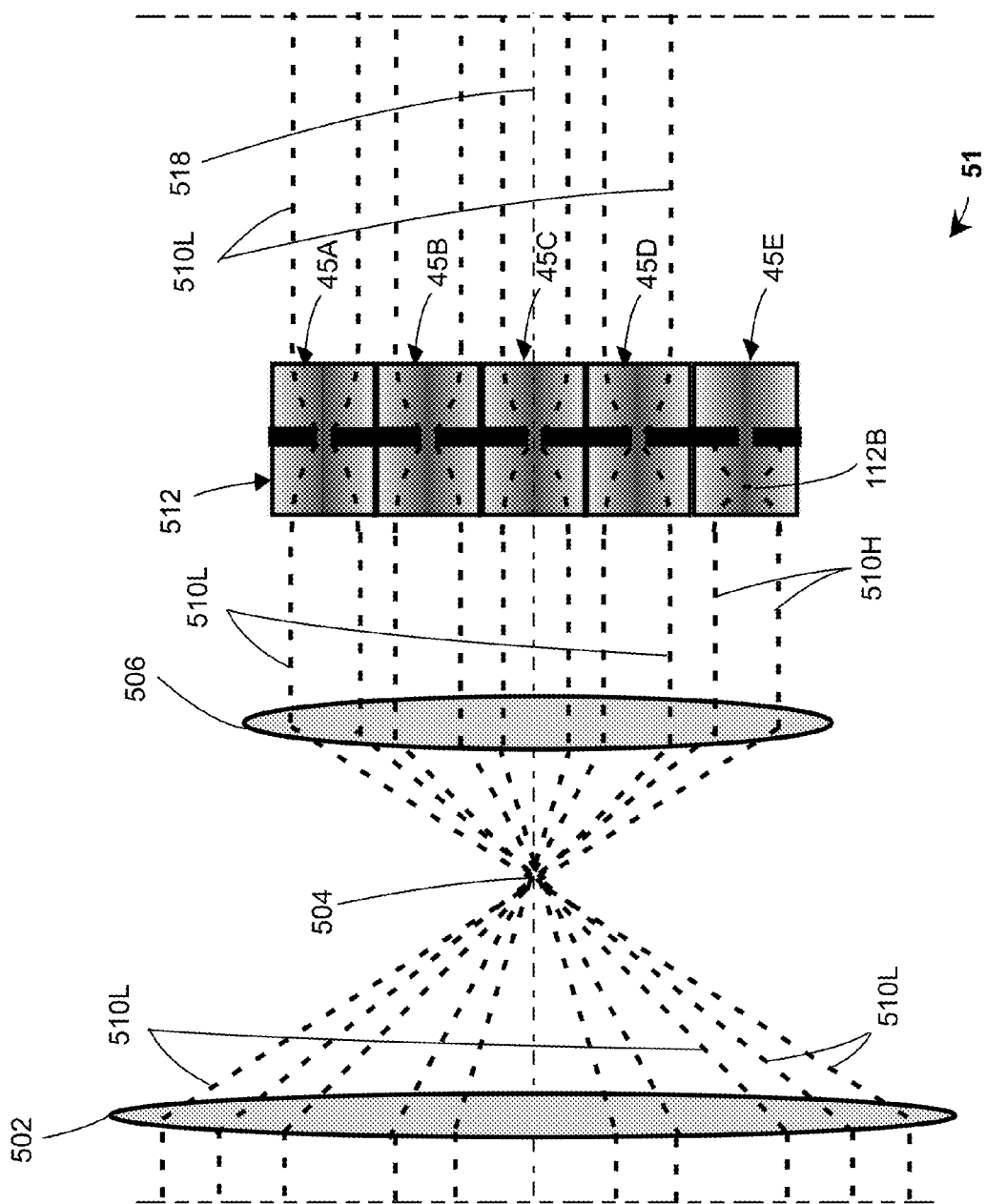
FIG. 5A is a cross-section view, schematically illustrating an optical-element array in accordance with the present disclosure.

FIG. 5A schematically illustrates an optical apparatus 51, optical apparatus 51 implements an optical-element array 512. Optical apparatus 51 has collimated light, the part of the light comprising a low intensity beam 510L and a high-intensity beam 510H, the light transmits through a positive lens 502, the thereby focusing at a focal point 504 of a lens 502. The light propagates to a lens 506, lens 506 positioned a focal length from focal point 504, thereby forming a telescopic system with lens 502. The light is collimated, exiting lens 506 and enters optical element array 512. Optical element array 512 comprises of an optical element 45A, 45B, 45C, 45D, and 45E. Optical-elements 45A, 45B, 45C, 45D, and 45E being the same as that shown in FIGS. 4H and 4I. Low-intensity light 510L transmit through optical-element array 512 via individual optical-elements 45A, 45B, 45C, and 45D and exit optical-element array 512 collimated. High-intensity light 510H enters optical-element array 512 via optical-element 45E, whereby it is blocked the nonlinear refractive change.

Figure 5B:
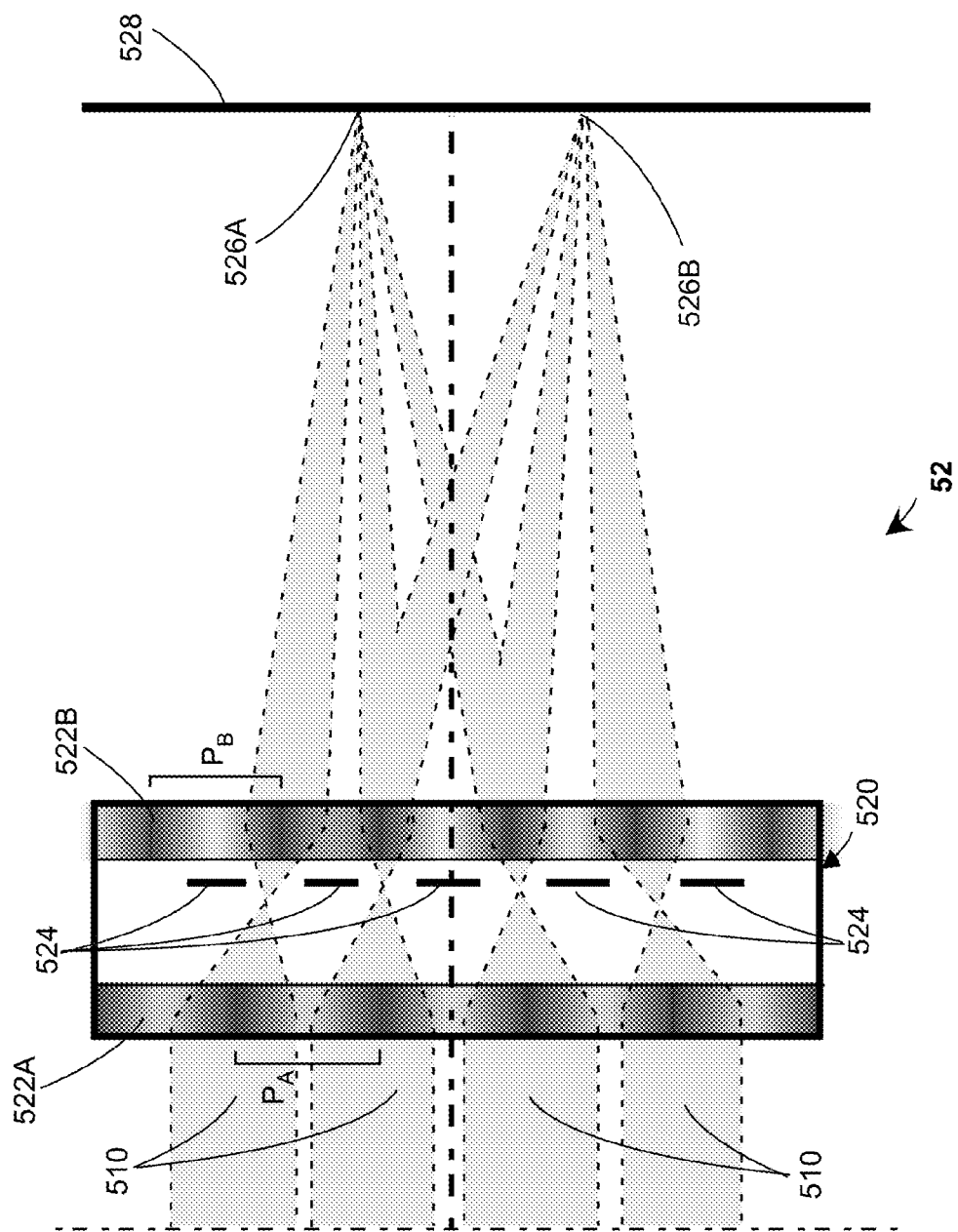
FIG. 5B is a cross-section view, schematically illustrating an imaging optical element, in accordance with the present disclosure.

FIG. 5B schematically illustrates an optical apparatus 52, optical apparatus 52 implementing imaging an optical-element 524. Optical apparatus has a light beam 510 from an object, the light enters an imaging optic 520. Imaging optic 520 comprises of a refractive gradient lens array 522A, an aperture array 524, and a refractive gradient lens array 522B. The gradient lenses of refractive gradient lens array 522A are spaced apart at a pitch distance $P_A$. Likewise the gradient lenses of refractive gradient array 522B are spaced apart at a pitch distance $P_B$. The distance between refractive gradient array 524 and refractive gradient 522B is the sum of their focal distance. Aperture array 524 is positioned about the focal point of the arrays. With this geometry the imaging optical-element's, object distance is described by:

$$s_i = \frac{f_2 \cdot p_A \cdot s_0}{s_0(p_1 - p_2) + p_B \cdot f_1}$$

where $s_i$ is the image distance, $s_0$ is the object space $f_1$ and $f_2$ are the focal lengths of the gradient lens array 522B respectively, $p_A$ and $p_B$ are the pitch of gradient lens array 522A and 522B respectively. Accordingly, light 510 focuses on an image plane 528, with a field point 526A and a field point 526B shown. Refractive gradient array 522A has NLO nanofillers such that high-intensity light is filtered via aforementioned absorption, scattering, reflection, or scattering mechanisms. For instance the NLO nanofillers can change the refractive index, via the optical Kerr effect, and be spatially filtered by the aperture array.

The optical-element, and preferred embodiments described, have a variety of applications and utility. Such optical-elements can be utilized to protect biological-matter, protect sensors, or otherwise filter light. The optical-element can be integrated into a window, display, eyewear, or heads-up display to protect the human eye from a laser or other intense light. The optical element can be integrated into waveguides and photonic circuits. The optical-element can be integrated into systems that illuminate organic-matter such as optical microscopes, confocal microscopes, flow cytometers, optical DNA sequencing systems, laser scalpels, LASIK systems, light based periodontal equipment, and other such systems that provide light delivery for illumination of biological matter. The optical-element can be placed or integrated within into photonic detector and photonics devices such as photodiodes, CCD arrays, gyro sensors, thermopiles and other such devices, either to protect the photonics devices from damage or allow for increased operational dynamic range in applications such as imaging, rangefinding, or spectroscopy. Alternatively the optical-element could be used with, or integrated within, various light sources, such as black body sources, lasers, light emitting diodes, and diode lasers to either limit or stabilize the output. Further the optical-element can be tailored for any aforementioned application with respect to spectral domain, time domain, or intensity.

From the description of the present disclosure provided herein one skilled in the art can design the optical-element and implement them in the described applications in accordance with the present disclosure. Those skilled in the art to which the present disclosure pertains will recognize that while above-described embodiments of the inventive optical-element and method of manufacture are exemplified using particular configurations, others may be used without departing from the spirit and scope of the present disclosure. The embodiments explained above assume symmetry around the optical-axis, one skilled in the art will recognize that radial symmetry is not a requirement recognizing off-axis and cylindrical optical-elements can made with the disclosed techniques.

In summary, the present invention is described above in terms of particular embodiments. The invention, however, is not limited to the embodiments described and depicted herein. Rather, the invention is limited only by the claims appended hereto.

What is claimed is:

1. A nonlinear nanocomposite optical-element comprising:
    a first nanocomposite, the first nanocomposite comprising an optically nonlinear (NLO) nanofiller dispersed in a cured organic-matrix;
    a second nanocomposite, the second nanocomposite comprising a linear nanofiller dispersed in the cured organic-matrix; and
    wherein the NLO nanofiller has a high $\chi(^3)$ susceptibility relative to the linear nanofillers, and the distribution of the first nanocomposite and second nanocomposite result in a nanofiller gradient within the optical-element.

2. The optical-element of claim 1, wherein the linear nanofillers concentration varies spatially, forming a linear response refractive-gradient, thereby spatially varying the complex refractive-index within the optical-element.

3. The optical-element of claim 2, wherein the linear response refractive-gradient varies radially from the optical-element's optical axis.

4. The optical-element of claim 2, wherein the linear response refractive-gradient varies both radially from, and along, the optical-element's optical axis.

5. The optical-element of claim 1, wherein the NLO nanofillers concentration varies spatially, forming a nonlinear response gradient (NLO gradient), thereby spatially varying the high $\chi^{(3)}$ susceptibility within the optical element.

6. The optical-element of claim 5, wherein the NLO gradient varies radially from the optical-element's optical axis.

7. The optical-element of claim 5, wherein the NLO gradient varies both radially from, and along, the optical-element's optical axis.

8. The optical-element of claim 1, wherein the NLO nanofiller exhibits a single high-order nonlinear effect, the nonlinear effect from the group comprising absorption, refraction, reflection, or scattering.

9. The optical-element of claim 1, wherein the NLO nanofillers exhibit a plurality of high-order nonlinear effects, the plurality of effects being from the group comprising absorption, refraction, reflection, and scattering effects.

10. The optical-element of claim 1, wherein the NLO nanofillers exhibit a plurality of both linear and high-order nonlinear effects, the plurality of effects including being from the group comprising absorption, refraction, reflection, and scattering effects.

11. The optical-element of claim 1, wherein the nanofillers sizes are sufficiently smaller than wavelengths of light for the optical-element's intended use, not to scatter light.

12. The optical-element of claim 1, wherein the optical-element is a gradient-index refractive (GRIN) lens.

13. The optical-element of claim 12, wherein the optical-element's focal length changes as a function of incident light intensity.

14. The optical-element of claim 13, further comprising an aperture.

15. The optical-element of claim 14, wherein the aperture is comprised of metal or nanoparticle inks.

16. The optical-element of claim 15, where in the aperture is comprised of graphene or graphene oxide based nanoparticle-inks or dyes.

17. The optical-element of claim 15, wherein the amount of light transmitting through the aperture decreases, as the intensity of incident light increases.

18. The optical-element of claim 15, wherein the focal length of the optical-element increases, as the intensity of incident light increases.

19. The optical-element of claim 18, wherein the focal length change causes select wavelengths to pass through the aperture, and for other wavelengths to scatter or absorb on the aperture.

20. The optical-element of claim 1, wherein the optical-element has a first lens array.

21. The optical-element of claim 20, further including an aperture array where each of the apertures correspond with one of the lenses in the first lens array.

22. The optical-element of claim 21, further including a second lens array, wherein the first and second lens arrays are spaced apart at the sum of their effective focal lengths, with the aperture array between the lens arrays.

23. The device of claim 1, wherein nonlinear effects are induced by a laser.

24. The device of claim 1, further comprising a heat sink.

25. The device of claim 1, wherein the first and second nanocomposite correct axial and transverse chromatic aberrations.

26. The device of claim 25, wherein chromatic aberration correction is maintained with increased light intensity.

27. The device of claim 1, wherein the first and second nanocomposites increase chromatic dispersion, such that the optical path length of photons of different wavelengths, incident on the device at same position and fixed angle, are different as they traverse the device.

28. The device of claim 27, wherein the optical path length changes as a function of optical intensity.

29. The device of the claim 1, wherein at least the first or the second nanocomposites has a positive Abbe-number and at least one of the first or the second nanocomposite has a negative Abbe-number.

30. The optical element of claim 1, wherein the NLO nanofillers are composed of organic materials.

31. The optical element of claim 1, wherein the NLO nanofillers is comprised of graphene or graphene oxide based nanoparticles.

32. The optical element of claim 1, wherein the NLO nanofillers is comprised of a metal nanoparticle.

33. The optical element of claim 1, wherein the NLO nanofiller is comprised of an organic chromophore linked to a semiconductor or metal nanoparticle.

34. The optical element of claim 1, wherein the first and second nanocomposites are cured nanocomposite-inks, the uncured nanocomposite-inks being ink-jet printable.

35. The optical element of claim 1, wherein the device is designed to protect organic-matter.

36. The optical element of claim 1, wherein the device is designed to protect an image sensor from optical radiation damage.

37. The optical element of claim 1, wherein the device is included in an optical waveguide.

38. The optical element of claim 1, wherein the device is an optical limiter for picosecond or shorter laser pulses.

39. The optical element of claim 1, wherein the device is an optical limiter for laser light pulses shorter than 1 nanosecond.

40. The optical element of claim 1, wherein the device is an optical limiter for continuous wave laser pulses.

41. The optical element of claim 1, wherein the device is an optical limiter for modulated continuous wave laser pulses.

42. The optical element of claim 1, wherein the interaction of a plurality of lasers modulate the higher order complex susceptibility properties of the optical-element.

43. The optical element of claim 1, wherein the optical-element is deposited on a silicon substrate with microelectronic circuits.

44. The optical element of claim 1, wherein the nonlinear properties of the device are modulated by the refractive index and dielectric constant of the nanocomposite matrix.

45. The optical element of claim 1, wherein the organic matrix has a larger refractive index than the NLO nanofillers.

46. The optical element of claim 1, wherein the density of NLO nanofillers is larger than the density of linear nanofillers within the optical-element.

47. The optical element of claim 1, wherein the linear nanoparticles have a larger index of refraction than the nonlinear matrix.

48. The optical element of claim 1 wherein the nonlinear properties increase with the NLO nanofiller volumetric fill factor.

49. The optical element of claim 1, wherein the cured organic matrix increases the NLO nanofiller's plasmon resonance.

50. The optical element of claim 49, wherein the plasmon resonance's spectral width is widened by the dielectric constants of the linear nanofiller and the organic matrix.

51. The optical element of claim 49, wherein the plasmon peak frequency varies within the optical-element.

52. The optical element of claim 1, wherein the linear nanofillers or the NLO nanofillers are not spherical.

53. The optical element of claim 1, wherein nonlinear properties of the optical-element vary as a function of wavelength.

54. The optical element of claim 1, wherein the nonlinear properties of the device vary as a function of one or more spatial dimensions of the optical-element.

55. The optical element of claim 1, wherein the nonlinear effect is due to, two or more, photon nonlinear processes.

* * * * *